(12) United States Patent
Kumar et al.

(10) Patent No.: US 11,704,928 B1
(45) Date of Patent: Jul. 18, 2023

(54) FORCE-BASED FINGER DETECTION FOR FINGERPRINT SENSOR SYSTEMS

(71) Applicant: QUALCOMM Incorporated, San Diego, CA (US)

(72) Inventors: Raj Kumar, San Diego, CA (US); Mohamed Ahmed, San Marcos, CA (US); Kritpal Singh Dhindhsa, Hyderabad (IN); Deepak Rajendra Karnik, San Diego, CA (US); Seong Jun Ma, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/651,540

(22) Filed: Feb. 17, 2022

(51) Int. Cl.
*G06V 40/13* (2022.01)
*G06F 3/041* (2006.01)
*G06F 21/32* (2013.01)

(52) U.S. Cl.
CPC ........ *G06V 40/1306* (2022.01); *G06F 3/0412* (2013.01); *G06F 21/32* (2013.01)

(58) Field of Classification Search
CPC .... G06V 40/1306; G06F 3/0412; G06F 21/32
See application file for complete search history.

(56) References Cited

U.S. PATENT DOCUMENTS

2018/0369866 A1* 12/2018 Sammoura .............. G06F 3/043
2021/0319197 A1* 10/2021 Chang .................. G09G 3/3233

* cited by examiner

*Primary Examiner* — Jonathan A Boyd
(74) *Attorney, Agent, or Firm* — Qualcomm Incorporated

(57) ABSTRACT

Methods, devices and systems for controlling a fingerprint sensor system are disclosed. Some examples involve receiving a contact indication corresponding to a contact of an object with a surface of an apparatus and determining, responsive to the contact indication, multiple force values corresponding to contact of the object with the surface during a force monitoring time interval. Some examples involve determining whether at least a plurality of the multiple force values exceeds a force threshold and controlling a fingerprint sensor system based, at least in part, on whether at least the plurality of the multiple force values exceeds the force threshold.

22 Claims, 12 Drawing Sheets

| Use-Case Scenarios for Real vs. False Finger Down Events | Force Sequences |
|---|---|
| Normal Finger Press | 50gf, 70gf, 120gf, 170gf, 350gf |
| Light Finger Press | 50gf, 70gf, 90gf, 120gf, 150gf |
| Lightweight Object(s) on Fingerprint Sensor Area While in a Moving Vehicle | 10gf, 15gf, 25gf, 15gf, 10gf |
| Lightweight Object Placed on Fingerprint Sensor Area | 10gf, 15gf, 25gf, 50gf, 50gf, 50gf |
| User on Treadmill at 1 to 7 MPH | 10gf, 50gf, 15gf, 40gf, 0gf |

*Figure 3B*

| Finger Up Events | Force Sequences |
|---|---|
| Normal Finger Up Event | 350gf, 230gf, 145gf, 90gf, 45gf, 0gf |
| Light Touch Finger Up Event | 150gf, 110gf, 80gf, 60gf, 30gf, 0 gf |

*Figure 3C*

FORCE-BASED FINGER DETECTION FOR FINGERPRINT SENSOR SYSTEMS

TECHNICAL FIELD

This disclosure relates generally to sensor devices and related methods, including but not limited to fingerprint sensor systems and methods for using such systems.

DESCRIPTION OF THE RELATED TECHNOLOGY

Biometric authentication, including but not limited to fingerprint-based authentication, can be an important feature for controlling access to devices, etc. Many existing products include some type of biometric authentication. Although some existing biometric authentication technologies provide satisfactory performance, improved methods and devices would be desirable.

SUMMARY

The systems, methods and devices of the disclosure each have several innovative aspects, no single one of which is solely responsible for the desirable attributes disclosed herein.

One innovative aspect of the subject matter described in this disclosure may be implemented in a method of controlling a fingerprint sensor system. In some examples, the method may involve receiving a contact indication corresponding to a contact of an object with a surface of an apparatus. The method may involve determining multiple force values corresponding to the contact of the object with the surface during a force monitoring time interval. In some examples, the method may involve determining whether at least a plurality of the multiple force values exceeds a force threshold. The method may involve controlling the fingerprint sensor system based, at least in part, on whether at least the plurality of the multiple force values exceeds the force threshold.

In some instances in which it is determined that at least the plurality of the multiple force values exceeds the force threshold, the method also may involve controlling the fingerprint sensor system based, at least in part, on whether the plurality of the multiple force values matches a digit touch force pattern. In some examples, the digit touch force pattern may be, or may include, a sequence of force measurements. In some instances, the sequence of force measurements may be within a force range. According to some examples, the sequence of force measurements may be, or may include, at least N consecutive increasing force measurements within the force range, where N is an integer ≥3.

Other innovative aspects of the subject matter described in this disclosure may be implemented in an apparatus. In some examples, the apparatus may include a fingerprint sensor system and a force sensor system. In some examples, the apparatus may include a control system. The control system may include one or more general purpose single- or multi-chip processors, digital signal processors (DSPs), application specific integrated circuits (ASICs), field programmable gate arrays (FPGAs) or other programmable logic devices, discrete gates or transistor logic, discrete hardware components, or combinations thereof.

According to some examples, the control system may be configured to receive a contact indication corresponding to a contact of an object with a surface of the apparatus. In some examples, the control system may be configured to determine, via the force sensor system, multiple force values corresponding to the contact of the object with the surface during a force monitoring time interval. According to some examples, the control system may be configured to determine whether at least a plurality of the multiple force values exceeds a force threshold. In some examples, the control system may be configured to control the fingerprint sensor system based, at least in part, on whether at least the plurality of the multiple force values exceeds the force threshold.

In some examples in which the control system determines that at least the plurality of the multiple force values exceeds the force threshold, the control system may be further configured to control the fingerprint sensor system based, at least in part, on whether the plurality of the multiple force values matches a digit touch force pattern. In some instances, the digit touch force pattern may be, or may include, a sequence of force measurements. In some examples, the sequence of force measurements may be within a force range. In some examples, the sequence of force measurements may be, or may include, at least N consecutive increasing force measurements within the force range, where N is an integer ≥3.

In some examples, the control system may be further configured to control the fingerprint sensor system to initiate a fingerprint sensor scan associated with determining that the plurality of the multiple force values matches the digit touch force pattern. In some implementations, the control system may be further configured to estimate, based at least in part on fingerprint image data associated with the fingerprint sensor scan, whether the object is a digit. In some examples, the control system may be further configured to initiate fingerprint image data processing functionality responsive to estimating that the object is a digit. According to some examples, initiating the fingerprint image data processing functionality may involve sending a wakeup signal from a first portion of the control system configured to control the fingerprint sensor system to a second portion of the control system configured for fingerprint image data processing.

Some or all of the operations, functions and/or methods described herein may be performed by one or more devices according to instructions (e.g., software) stored on one or more non-transitory media. Such non-transitory media may include memory devices such as those described herein, including but not limited to random access memory (RAM) devices, read-only memory (ROM) devices, etc. Accordingly, some innovative aspects of the subject matter described in this disclosure can be implemented in one or more non-transitory media having software stored thereon.

For example, the software may include instructions for controlling one or more devices to perform a method. According to some examples, the method may involve receiving a contact indication corresponding to a contact of an object with a surface of an apparatus. The method may involve determining multiple force values corresponding to the contact of the object with the surface during a force monitoring time interval. In some examples, the method may involve determining whether at least a plurality of the multiple force values exceeds a force threshold. The method may involve controlling the fingerprint sensor system based, at least in part, on whether at least the plurality of the multiple force values exceeds the force threshold.

In some instances in which it is determined that at least the plurality of the multiple force values exceeds the force threshold, the method also may involve controlling the fingerprint sensor system based, at least in part, on whether the plurality of the multiple force values matches a digit touch force pattern. In some examples, the digit touch force pattern may be, or may include, a sequence of force measurements. In some instances, the sequence of force measurements may be within a force range. According to some examples, the sequence of force measurements may be, or may include, at least N consecutive increasing force measurements within the force range, where N is an integer ≥3.

BRIEF DESCRIPTION OF THE DRAWINGS

Details of one or more implementations of the subject matter described in this specification are set forth in the accompanying drawings and the description below. Other features, aspects, and advantages will become apparent from the description, the drawings, and the claims. Note that the relative dimensions of the following figures may not be drawn to scale. Like reference numbers and designations in the various drawings indicate like elements.

FIG. 3B shows examples of sequences of forces caused by various phenomena, including finger down force sequences.

FIG. 3C shows examples of sequences of forces caused by a digit being lifted from an outer surface of an apparatus.

DETAILED DESCRIPTION

Figure 1:
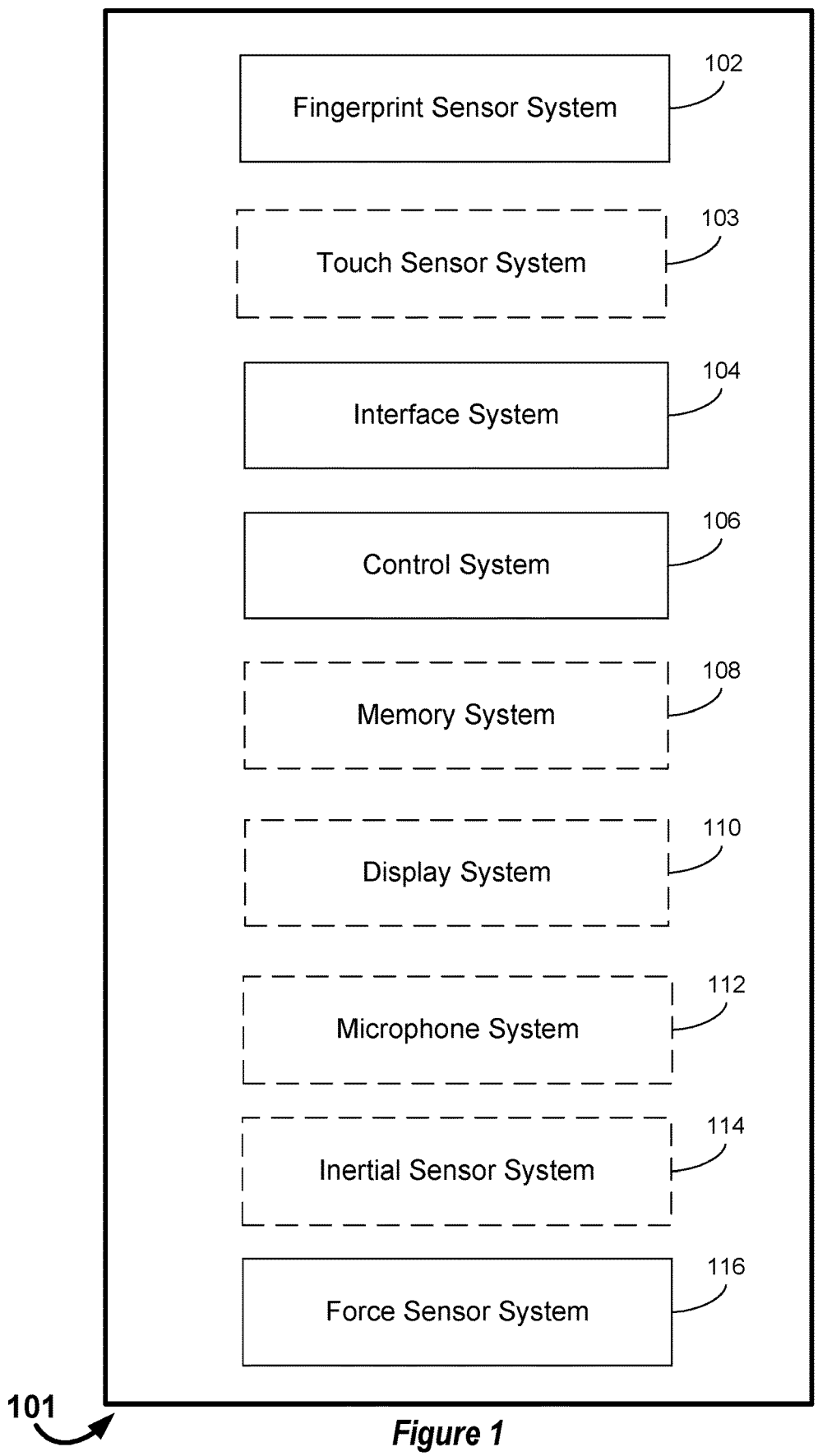
FIG. 1 is a block diagram that shows example components of an apparatus according to some disclosed implementations.

The following description is directed to certain implementations for the purposes of describing the innovative aspects of this disclosure. However, a person having ordinary skill in the art will readily recognize that the teachings herein may be applied in a multitude of different ways. The described implementations may be implemented in any device, apparatus, or system that includes a biometric system as disclosed herein. In addition, it is contemplated that the described implementations may be included in or associated with a variety of electronic devices such as, but not limited to: mobile telephones, multimedia Internet enabled cellular telephones, mobile television receivers, wireless devices, smartphones, smart cards, wearable devices such as bracelets, armbands, wristbands, rings, headbands, patches, etc., Bluetooth® devices, personal data assistants (PDAs), wireless electronic mail receivers, hand-held or portable computers, netbooks, notebooks, smartbooks, tablets, printers, copiers, scanners, facsimile devices, global positioning system (GPS) receivers/navigators, cameras, digital media players (such as MP3 players), camcorders, game consoles, wrist watches, clocks, calculators, television monitors, flat panel displays, electronic reading devices (e.g., e-readers), mobile health devices, computer monitors, auto displays (including odometer and speedometer displays, etc.), cockpit controls and/or displays, camera view displays (such as the display of a rear view camera in a vehicle), electronic photographs, electronic billboards or signs, projectors, architectural structures, microwaves, refrigerators, stereo systems, cassette recorders or players, DVD players, CD players, VCRs, radios, portable memory chips, washers, dryers, washer/dryers, parking meters, packaging (such as in electromechanical systems (EMS) applications including microelectromechanical systems (MEMS) applications, as well as non-EMS applications), aesthetic structures (such as display of images on a piece of jewelry or clothing) and a variety of EMS devices. The teachings herein also may be used in applications such as, but not limited to, electronic switching devices, radio frequency filters, sensors, accelerometers, gyroscopes, motion-sensing devices, magnetometers, inertial components for consumer electronics, parts of consumer electronics products, steering wheels or other automobile parts, varactors, liquid crystal devices, electrophoretic devices, drive schemes, manufacturing processes and electronic test equipment. Thus, the teachings are not intended to be limited to the implementations depicted solely in the Figures, but instead have wide applicability as will be readily apparent to one having ordinary skill in the art.

Many types of biometric sensors, such as fingerprint sensors, are susceptible to false wakeups. As used herein, the word "finger" corresponds to any digit, including a thumb. Accordingly, a thumbprint is one type of "fingerprint." As used herein, the term "false wakeup" refers to an activation of at least a portion of the fingerprint sensor (such as a transmitter portion) responsive to an event other than a user's actual authentication attempt. One example of a false wakeup is an activation of at least a portion of the fingerprint sensor responsive to an event other than a finger contact in a fingerprint sensor area of an apparatus that includes the fingerprint sensor. The apparatus that includes the fingerprint sensor may, for example, be a mobile device such as a cellular telephone. In some examples, a false wakeup may be caused when a user carrying a mobile device that includes the fingerprint sensor is walking, running, fidgeting with the mobile device, etc. In some instances, a false wakeup may be caused when the mobile device is carried in a user's pocket, for example when the mobile device contacts or otherwise detects objects in the pocket. In some instances, a false wakeup may be caused due to the proximity of objects to a touch sensor, such as the proximity of metal objects to a capacitive touch sensor.

False wakeups can cause many types of negative effects. For example, false wakeups of a fingerprint sensor may cause power to be wasted by pointlessly activating a transmitter of the fingerprint sensor. In some instances, false wakeups of a fingerprint sensor may cause power to be wasted by unnecessarily activating an image processing portion of the fingerprint sensor, or of a device that includes the fingerprint sensor. False wakeups of a fingerprint sensor may, in some instances, cause numerous unintentional biometric authentication attempts which can lead to temporary "lock-ups" during which the biometric authentication functionality is disabled because a threshold number of authentication attempts has been exceeded. When a mobile device locks up, the user may only be able to unlock the mobile device by entering a code. In such cases, the biometric sensor non-functional and this negatively impacts the user experience.

Some disclosed methods may involve determining, responsive to a contact indication (an indication that may be associated with contact of an object with a surface of an apparatus), multiple force values corresponding to the contact of the object with the surface during a force monitoring time interval. Some examples may involve determining whether at least a plurality of the multiple force values exceeds a force threshold. Some implementations may involve determining whether the plurality of the multiple force values that exceeds the force threshold also matches a digit touch force pattern. The digit touch force pattern may, for example, be a characteristic pattern of a digit being pressed on a surface of the apparatus or a digit being lifted from the surface. According to some such methods, a fingerprint sensor scan may not be triggered if the multiple force values do not exceed the force threshold and/or if the plurality of the multiple force values do not match the digit touch force pattern. Some such methods may involve estimating, based at least in part on fingerprint sensor data obtained from the object, whether the object is a finger.

Particular implementations of the subject matter described in this disclosure may be implemented to realize one or more of the following potential advantages. Some disclosed methods can substantially reduce the number of false wakeups of a fingerprint sensor. Less power is wasted if there are fewer false wakeups. Having fewer false wake-ups also may enhance the user experience, not least because the user will experience fewer lock-ups.

FIG. 1 is a block diagram that shows example components of an apparatus according to some disclosed implementations. In this example, the apparatus 101 includes a fingerprint sensor system 102, an interface system 104, a control system 106 and a force sensor system. Some implementations may include a touch sensor system 103, a memory system 108, a display system 110, a microphone system 112, an inertial sensor system 114 and/or a gesture sensor system (not shown in FIG. 1).

According to some examples, the fingerprint sensor system 102 may be, or may include, an ultrasonic fingerprint sensor. Alternatively, or additionally, in some implementations the fingerprint sensor system 102 may be, or may include, another type of fingerprint sensor, such as an optical fingerprint sensor, a photoacoustic fingerprint sensor, etc. In some examples, an ultrasonic version of the fingerprint sensor system 102 may include an ultrasonic receiver and a separate ultrasonic transmitter. In some such examples, the ultrasonic transmitter may include an ultrasonic plane-wave generator. However, various examples of ultrasonic fingerprint sensors are disclosed herein, some of which may include a separate ultrasonic transmitter and some of which may not. For example, in some implementations, the fingerprint sensor system 102 may include a piezoelectric receiver layer, such as a layer of polyvinylidene fluoride PVDF polymer or a layer of polyvinylidene fluoride-trifluoroethylene (PVDF-TrFE) copolymer. In some implementations, a separate piezoelectric layer may serve as the ultrasonic transmitter. In some implementations, a single piezoelectric layer may serve as both a transmitter and a receiver. The fingerprint sensor system 102 may, in some examples, include an array of ultrasonic transducer elements, such as an array of piezoelectric micromachined ultrasonic transducers (PMUTs), an array of capacitive micromachined ultrasonic transducers (CMUTs), etc. In some such examples, PMUT elements in a single-layer array of PMUTs or CMUT elements in a single-layer array of CMUTs may be used as ultrasonic transmitters as well as ultrasonic receivers.

Data received from the fingerprint sensor system 102 may sometimes be referred to herein as "fingerprint sensor data," "fingerprint image data," etc., although the data will generally be received from the fingerprint sensor system in the form of electrical signals. Accordingly, without additional processing such image data would not necessarily be perceivable by a human being as an image.

The optional touch sensor system 103 may be, or may include, a resistive touch sensor system, a surface capacitive touch sensor system, a projected capacitive touch sensor system, a surface acoustic wave touch sensor system, an infrared touch sensor system, or any other suitable type of touch sensor system. In some implementations, the area of the touch sensor system 103 may extend over most or all of a display portion of the display system 110.

In some examples, the interface system 104 may include a wireless interface system. In some implementations, the interface system 104 may include a user interface system, one or more network interfaces, one or more interfaces between the control system 106 and the fingerprint sensor system 102, one or more interfaces between the control system 106 and the touch sensor system 103, one or more interfaces between the control system 106 and the memory system 108, one or more interfaces between the control system 106 and the display system 110, one or more interfaces between the control system 106 and the microphone system 112, one or more interfaces between the control system 106 and the inertial sensor system 114, one or more interfaces between the control system 106 and the force sensor system 116 and/or one or more interfaces between the control system 106 and one or more external device interfaces (e.g., ports or applications processors).

The interface system 104 may be configured to provide communication (which may include wired or wireless communication, electrical communication, radio communication, etc.) between components of the apparatus 101. In some such examples, the interface system 104 may be configured to provide communication between the control system 106 and the fingerprint sensor system 102. According to some such examples, the interface system 104 may couple at least a portion of the control system 106 to the fingerprint sensor system 102 and the interface system 104 may couple at least a portion of the control system 106 to the touch sensor system 103, e.g., via electrically conducting material (e.g., via conductive metal wires or traces. According to some examples, the interface system 104 may be configured to provide communication between the apparatus 101 and other devices and/or human beings. In some such examples, the interface system 104 may include one or more user interfaces. The interface system 104 may, in some examples, include one or more network interfaces and/or one or more external device interfaces (such as one or more universal serial bus (USB) interfaces or a serial peripheral interface (SPI)).

The control system 106 may include one or more general purpose single- or multi-chip processors, digital signal processors (DSPs), application specific integrated circuits (ASICs), field programmable gate arrays (FPGAs) or other programmable logic devices, discrete gates or transistor logic, discrete hardware components, or combinations thereof. According to some examples, the control system 106 also may include one or more memory devices, such as one or more random access memory (RAM) devices, read-only memory (ROM) devices, etc. In this example, the control system 106 is configured for communication with, and for controlling, the display system 110. In implementations wherein the apparatus includes a fingerprint sensor system 102, the control system 106 is configured for communication with, and for controlling, the fingerprint sensor system 102. In implementations wherein the apparatus includes a touch sensor system 103, the control system 106 is configured for communication with, and for controlling, the touch sensor system 103. In implementations wherein the apparatus includes a memory system 108 that is separate from the control system 106, the control system 106 also may be configured for communication with the memory system 108. In implementations wherein the apparatus includes a microphone system 112, the control system 106 is configured for communication with, and for controlling, the microphone system 112. In implementations wherein the apparatus includes an inertial sensor system 114, the control system 106 is configured for communication with, and for controlling, the inertial sensor system 114. According to some examples, the control system 106 may include one or more dedicated components that are configured for controlling the fingerprint sensor system 102, the touch sensor system 103, the memory system 108, the display system 110, the microphone system 112 and/or the inertial sensor system 114.

Some examples of dedicated components that are configured for controlling at least a portion of the fingerprint sensor system 102 (and/or for processing fingerprint image data received from the fingerprint sensor system 102) are described below. Although the control system 106 and the fingerprint sensor system 102 are shown as separate components in FIG. 1, in some implementations at least a portion of the control system 106 and at least a portion of the fingerprint sensor system 102 may be co-located. For example, in some implementations one or more components of the fingerprint sensor system 102 may reside on an integrated circuit or "chip" of the control system 106. According to some implementations, functionality of the control system 106 may be partitioned between one or more controllers or processors, such as between a dedicated sensor controller and an applications processor (also referred to herein as a "host" processor) of an apparatus, such as a host processor of a mobile device. In some such implementations, at least a portion of the host processor may be configured for fingerprint image data processing, determination of whether currently-acquired fingerprint image data matches previously-obtained fingerprint image data (such as fingerprint image data obtained during an enrollment process), etc.

In some examples, the memory system 108 may include one or more memory devices, such as one or more RAM devices, ROM devices, etc. In some implementations, the memory system 108 may include one or more computer-readable media, storage media and/or storage media. Computer-readable media include both computer storage media and communication media including any medium that may be enabled to transfer a computer program from one place to another. Storage media may be any available media that may be accessed by a computer. In some examples, the memory system 108 may include one or more non-transitory media. By way of example, and not limitation, non-transitory media may include RAM, ROM, electrically erasable programmable read-only memory (EEPROM), compact disc ROM (CD-ROM) or other optical disk storage, magnetic disk storage or other magnetic storage devices, or any other medium that may be used to store desired program code in the form of instructions or data structures and that may be accessed by a computer.

In some examples, the apparatus 101 includes a display system 110, which may include one or more displays. In some examples, the display system 110 may be, or may include, a light-emitting diode (LED) display, such as an organic light-emitting diode (OLED) display. In some such examples, the display system 110 may include layers, which may be referred to collectively as a "display stack."

In some implementations, the apparatus 101 may include a microphone system 112. The microphone system 112 may include one or more microphones.

According to some implementations, the apparatus 101 may include an inertial sensor system 114. The inertial sensor system 114 may include one or more types of inertial sensors, such as one or more gyroscopes and/or one or more accelerometers. The inertial sensor system 114 may be configured to provide inertial sensor data to the control system 106 indicating the orientation of the apparatus 101, acceleration of the apparatus 101, etc.

In this example, the apparatus 101 includes a force sensor system 116. The force sensor 116 may be, or may include, a piezo-resistive sensor, a capacitive sensor, a thin film sensor (e.g., a polymer-based thin film sensor), or another type of suitable force sensor. If the force sensor 116 includes a piezo-resistive sensor, the piezo-resistive sensor may include silicon, metal, polysilicon and/or glass. The fingerprint sensor system 102 and the force sensor 116 may, in some instances, be mechanically coupled. In some such examples, the force sensor 116 may be integrated into circuitry of the fingerprint sensor system 102. However, in other implementations the force sensor 116 may not be integrated with the fingerprint sensor system 102. The fingerprint sensor system 102 and the force sensor 116 may, in some examples, be indirectly coupled. For example, the fingerprint sensor system 102 and the force sensor 116 each may be coupled to a portion of the apparatus 101. In some such examples, the fingerprint sensor system 102 and the force sensor 116 each may be coupled to a portion of the control system.

In some examples, the force sensor system 116 may be calibrated, e.g., at the factory in which the apparatus 101 is assembled. The calibration process may, for example, involve applying a known force to the force sensor system 116 and calibrating the output signals from the force sensor system 116 to match the known force. The known force may, in some instances, correspond to a known mass, such as a 1-kilogram mass.

In some implementations, the apparatus 101 may include a gesture sensor system. The gesture sensor system may be, or may include, an ultrasonic gesture sensor system, an optical gesture sensor system or any other suitable type of gesture sensor system.

The apparatus 101 may be used in a variety of different contexts, some examples of which are disclosed herein. For example, in some implementations a mobile device may include at least a portion of the apparatus 101. In some implementations, a wearable device may include at least a portion of the apparatus 101. The wearable device may, for example, be a bracelet, an armband, a wristband, a ring, a headband or a patch. In some implementations, the control system 106 may reside in more than one device. For example, a portion of the control system 106 may reside in a wearable device and another portion of the control system 106 may reside in another device, such as a mobile device (e.g., a smartphone). The interface system 104 also may, in some such examples, reside in more than one device.

Figure 2:
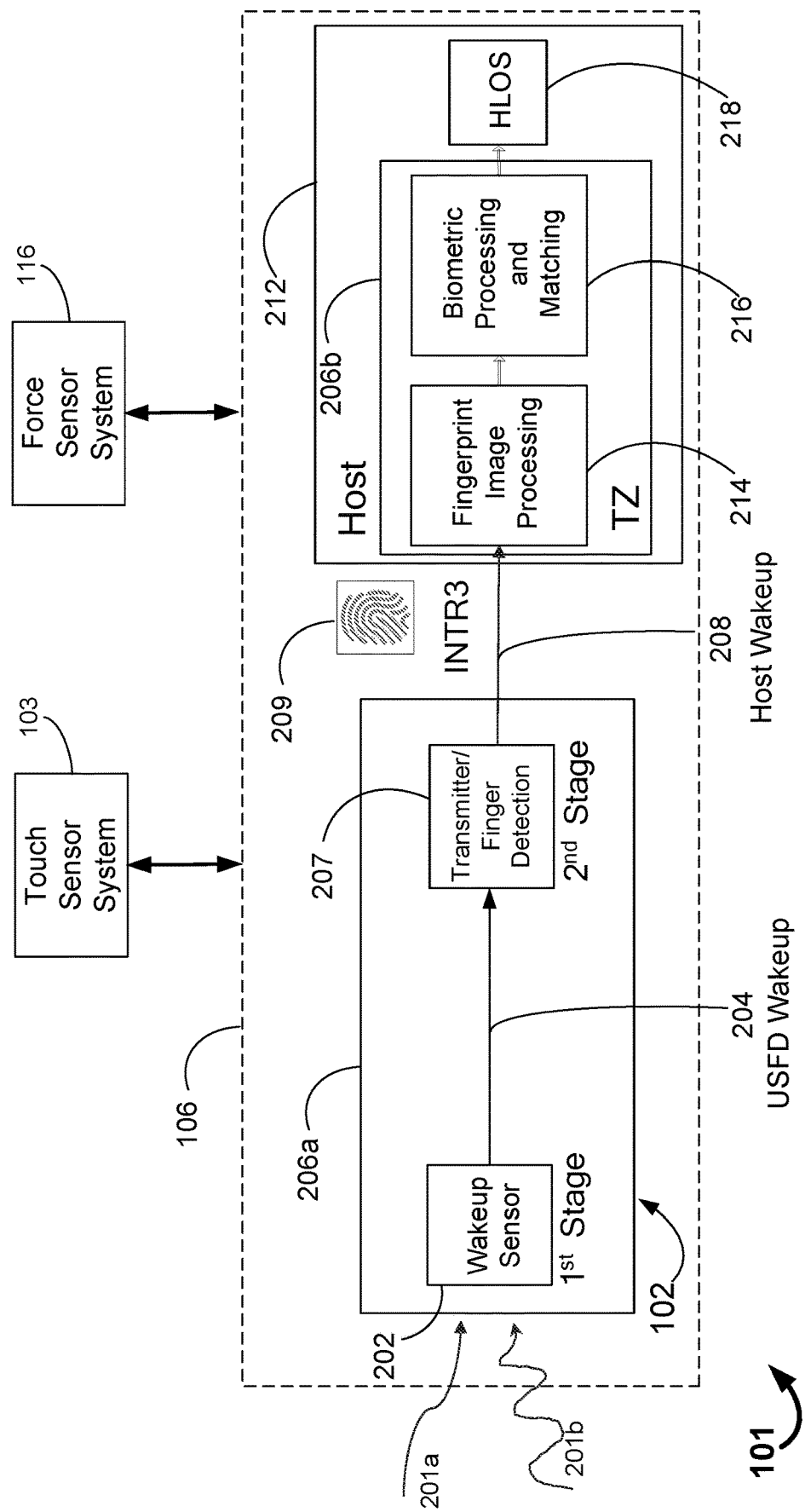
FIG. 2 shows an example of the apparatus of FIG. 1.

FIG. 2 shows an example of the apparatus of FIG. 1. As with other disclosed implementations, the scale, numbers, arrangements and types of the elements shown in FIG. 2 are merely presented for illustrative purposes. Other implementations of the apparatus 101 may have different numbers, arrangements and/or types of elements.

In this example, the apparatus 101 includes a fingerprint sensor system 102 and a control system 106, which are instances of the fingerprint sensor system 102 and control system 106 that are described above with reference to FIG. 1. According to this example, the fingerprint sensor system 102 includes a wakeup sensor portion 202 and a transmitter portion 207. In this implementation, the fingerprint sensor system 102 is, or includes, an ultrasonic fingerprint sensor. In other examples, the fingerprint sensor system 102 may be, or may include, another type of fingerprint sensor, such as an optical fingerprint sensor, a photoacoustic fingerprint sensor, etc.

According to this implementation, the control system 106 includes a fingerprint sensor control system portion 206a and a fingerprint image data processing control system portion 206b. In this implementation, the fingerprint sensor control system portion 206a is implemented via a dedicated processor, which in this example is an integrated circuit or "chip" of the control system 106. In some examples, one or more components of the fingerprint sensor system 102 may reside on the same chip that implements the fingerprint sensor control system portion 206a. In the example shown in FIG. 2, at least the wakeup sensor portion 202 and the transmitter portion 207 of the fingerprint sensor system 102 reside on the same chip that implements the fingerprint sensor control system portion 206a.

In this example, the fingerprint sensor control system portion 206a is configured to control the transmitter portion 207. According to this implementation, the fingerprint sensor control system portion 206a is also configured to estimate, based at least in part on fingerprint sensor data obtained from an object in contact with the outer surface of the apparatus in the fingerprint sensor area, whether the object is a finger. The fingerprint sensor control system portion 206a may, in some examples, be capable of maintaining the transmitter portion 207 in an "off" state when operating the wakeup sensor portion 202 in a force-sensing mode, which in some implementations may not require power to be applied to the wakeup sensor portion 202.

In this implementation, the fingerprint image data processing control system portion 206b is configured to process fingerprint image data 209 obtained by the fingerprint sensor system 102 responsive to receiving a host wakeup signal 208 and fingerprint image data 209 from the fingerprint sensor control system portion 206a. According to this example, the fingerprint image data processing control system portion 206b includes a fingerprint image processing module 214 and a biometric processing and matching module 216. In this example, the fingerprint image processing module 214 and the biometric processing and matching module 216 reside in a trusted zone (TZ) of a host processor 212. In some instances, the fingerprint image processing module 214 may be configured to determine fingerprint features, such as fingerprint minutiae, based on the fingerprint image data 209. According to some examples, the biometric processing and matching module 216 may be configured to determine whether a currently-obtained set of fingerprint minutiae matches a previously-obtained set of fingerprint minutiae, the latter of which may have been obtained during an enrollment process. According to this implementation, the host processor 212 is a multi-purpose processor that is also configured to run a high-level operating system (HLOS) 218. The host processor 212 may, for example, be a multi-core processor. In some examples, one of the cores may be used to implement the fingerprint image data processing control system portion 206b.

In this example, the wakeup sensor portion 202 is configured to send an activation signal 204 to the transmitter portion 207, e.g., responsive to a detected force or acceleration. In FIG. 2, the term "USFD Wakeup" is associated with activation signal 204, because in this example the activation signal 204 also causes an ultrasonic finger detection (USFD) process to be initiated. In some examples, the wakeup sensor portion 202 may be configured to send an activation signal to the transmitter portion 207 responsive to what may be referred to herein as a "contact indication," which is an indication of contact with the apparatus 101. In some examples, a contact indication may be an indication of contact with an outer surface of the apparatus 101 in a fingerprint sensor area. Examples of a "fingerprint sensor area" are provided herein. In some such examples, the wakeup sensor portion 202 may be configured to send an activation signal to the transmitter portion 207 responsive to a contact indication that equals or exceeds a contact indication threshold.

In some instances, the contact indication may correspond with an object in contact with an outer surface of the apparatus in the fingerprint sensor area, such as a finger touch or tap intended for biometric authentication (element 201a of FIG. 2). According to some such examples, the contact indication threshold may be a force threshold, a pressure threshold, etc. In some implementations, at least a portion of the fingerprint sensor system 102 (such as the wakeup sensor portion 202) may include a piezoelectric sensor component. In some such examples, the contact indication threshold may correspond with a piezoelectric threshold, such as a voltage threshold of electrical signals produced by the piezoelectric sensor component. However, in some examples the contact indication may correspond with one or more other signals, such as one or more touch sensor signals from the touch sensor system 103.

In other instances, the contact indication may not correspond with a finger touch. In some such examples, the contact indication may correspond with one or more vibrations, accelerations, rotations or other disturbances (element 201b of FIG. 2), which may be interpreted as a contact indication by the fingerprint sensor control system portion 206a. In some instances, the contact indication may correspond with signals responsive to one or more non-finger objects detected by the touch sensor system 103. In some examples, the contact indication may correspond with one or more inertial sensor signals from an inertial sensor system, such as one or more signals from an accelerometer and/or from a gyroscope. Alternatively, or additionally, the contact indication may correspond with one or more microphone signals from a microphone system.

According to this example, responsive to the activation signal 204 the transmitter portion 207 will transmit ultrasonic waves towards an object that is presumed to be in an area of contact. In this implementation, the fingerprint sensor control system portion 206a is configured to estimate, based at least in part on fingerprint sensor data corresponding with ultrasonic waves reflected the object, whether the object is a finger.

In some examples, the wakeup sensor portion 202 and the transmitter portion 207 may be implemented via different functions of the same device, or by different functions of portions of the same device, e.g., as logical blocks or modules. In some such implementations, the wakeup sensor portion 202 and the transmitter portion 207 may be regarded as processing stages performed by the same device, or by portions of the same device, as suggested by the phrase "1$^{st}$ Stage" adjacent to the wakeup sensor portion 202 and the phrase "2$^{nd}$ Stage" adjacent to the transmitter portion 207. According to some such examples, the fingerprint sensor system 102 may include a piezoelectric layer that is configured to function as an ultrasonic transceiver. The piezoelectric layer may, for example, be configured to function as the transmitter portion 207 by transmitting ultrasonic waves when a voltage is applied. However, the same piezoelectric layer, or at least a portion of the same piezoelectric layer, may be configured to detect an applied force even when the fingerprint sensor system 102 is not powered on. In some such implementations, the same piezoelectric layer, or at least a portion of the same piezoelectric layer, may be configured to function as the wakeup sensor portion 202.

However, in some implementations the wakeup sensor portion 202 and the transmitter portion 207 may be implemented via separate physical devices, or by separate portions of the same physical device. For example, in some implementations the fingerprint sensor system 102 may be, or may include, an ultrasonic fingerprint sensor. In some such implementations, the fingerprint sensor system 102 may include separate ultrasonic transmitter and receiver portions, such as an ultrasonic transmitter layer and an ultrasonic receiver array. According to some such examples, the wakeup sensor portion 202 may be implemented by at least a portion of the ultrasonic transmitter layer or by at least a portion of the ultrasonic receiver array.

As noted above, in some instances the activation signal 204 will cause a "false wakeup," such as an activation of the transmitter portion 207 that is not responsive to a finger contact on the surface of the apparatus in the fingerprint sensor area. In some such examples, the false wakeup may cause the fingerprint sensor control system portion 206a to send a host wakeup signal 208 to the fingerprint image data processing control system portion 206b, needlessly causing at least a portion of the host processor 212 to use power.

As noted above, false wakeups can cause many types of negative effects. For example, false wakeups of a fingerprint sensor may cause power to be wasted by pointlessly activating the transmitter portion 207. In some instances, false wakeups of a fingerprint sensor may cause power to be wasted by unnecessarily activating the fingerprint image data processing control system portion 206b. Moreover, false wakeups may, in some instances, cause "lock-ups," which can cause user frustration.

Some disclosed devices, methods and systems can mitigate false wakeups. In the implementation shown in FIG. 2, for example, the control system 106 is configured to evaluate whether a contact indication corresponds to finger contact based, at least in part, on forces detected by the force sensor system 116. According to some examples, responsive to a contact indication, the control system may obtain multiple force values from the force sensor system responsive to a contact indication corresponding to contact of an object with the apparatus 101. In some such examples, the control system may obtain multiple force values from the force sensor system responsive to a contact indication corresponding to contact of an object with a surface of the apparatus 101 in a fingerprint sensor area.

In some examples, the multiple force values may be obtained at a force sampling time interval, such as 1 millisecond (ms), 2 ms, 3 ms, 4 ms, 5 ms, 6 ms, 7 ms, 8 ms, 9 ms, 10 ms, or some other force sampling time interval. The multiple force values may be obtained during a force monitoring time interval. In some instances, the force monitoring time interval may be greater than 5 ms, e.g., 10 ms, 15 ms, 20 ms, 25 ms, 30 ms, or some other force monitoring time interval.

In some examples, the control system 106 may be configured to determine whether the multiple force values exceed a force threshold. The force threshold may, in some examples, be 30 gram-force (gf), 35 gf, 40 gf, 45 gf, 50 gf, 55 gf, 60 gf, 65 gf, 70 gf, 75 gf, or some other force threshold.

In some such implementations, the control system 106 may be configured to determine whether multiple force values that exceed the force threshold also match a digit touch force pattern, such as a characteristic sequence of forces caused by a digit being pressed on a surface of the apparatus (also referred to herein as a "digit down" force pattern or a "finger down" force pattern) or a characteristic sequence of forces caused by a digit being lifted from the surface (also referred to herein as "digit up" force pattern or a "finger up" force pattern). Examples of finger down and finger up force patterns are provided herein. According to some such methods, the control system 106 may be configured to prevent a fingerprint sensor scan if the multiple force values do not exceed the force threshold and/or if the plurality of the multiple force values do not match the digit touch force pattern.

Figure 3A:
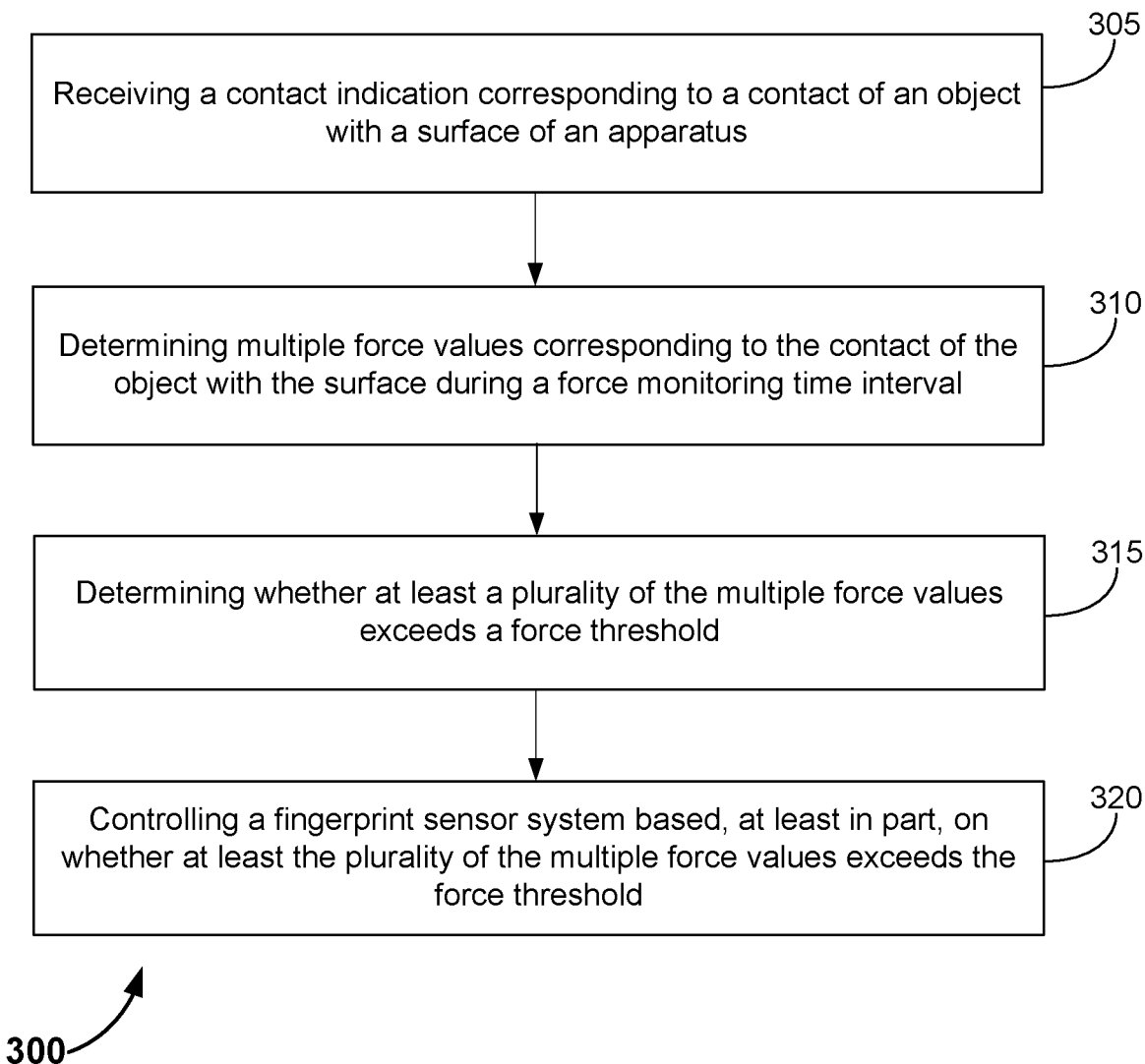
FIG. 3A is a flow diagram that provides examples of operations according to some disclosed methods.

FIG. 3A is a flow diagram that provides examples of operations according to some disclosed methods. The blocks of FIG. 3A may, for example, be performed by the apparatus 101 of FIG. 1 or FIG. 2, or by a similar apparatus. For example, the blocks of FIG. 4 may be performed, at least in part, by the control system 106 of FIG. 1 or FIG. 2. As with other methods disclosed herein, the methods outlined in FIG. 3A may include more or fewer blocks than indicated. Moreover, the blocks of methods disclosed herein are not necessarily performed in the order indicated. In some implementations, one or more blocks may be performed concurrently.

In this example block 305 involves receiving a contact indication corresponding to a contact of an object with a surface of an apparatus. In some instances, the contact indication may correspond with an object in contact with an outer surface of the apparatus in a fingerprint sensor area, such as a finger touch or tap intended for biometric authentication. According to some such examples, the contact indication threshold may be a force threshold, a pressure threshold, etc. In some such examples, the contact indication threshold may correspond with a piezoelectric threshold, such as a voltage threshold of electrical signals produced by a piezoelectric sensor component of a fingerprint sensor system. However, in some examples the contact indication may correspond with one or more other signals, such as one or more touch sensor signals from a touch sensor system 103.

In other instances, the contact indication may not correspond with a finger touch. In some such examples, the contact indication may correspond with one or more vibrations, accelerations, rotations or other disturbances, which may be interpreted as a contact indication by a control system. In some instances, the contact indication may correspond with signals responsive to one or more non-finger objects (such as metal objects) detected by a touch sensor system. In some examples, the contact indication may correspond with one or more inertial sensor signals from an inertial sensor system, such as one or more signals from an accelerometer and/or from a gyroscope.

According to this example, block 310 involves determining multiple force values corresponding to the contact of the object with the surface during a force monitoring time interval. In some examples, the multiple force values may be obtained at a force sampling time interval, such as 1 millisecond (ms), 2 ms, 3 ms, 4 ms, 5 ms, 6 ms, 7 ms, 8 ms, 9 ms, 10 ms, or some other force sampling time interval. The multiple force values may be obtained during a force monitoring time interval. In some instances, the force monitoring time interval may be greater than 5 ms, e.g., 10 ms, 15 ms, 20 ms, 25 ms, 30 ms, or some other force monitoring time interval.

In this example block 315 involves determining whether at least a plurality of the multiple force values exceeds a force threshold. The force threshold may, in some examples, be 30 gram-force (gf), 35 gf, 40 gf, 45 gf, 50 gf, 55 gf, 60 gf, 65 gf, 70 gf, 75 gf, or some other force threshold.

According to this example, block 320 involves controlling a fingerprint sensor system based, at least in part, on whether at least the plurality of the multiple force values exceeds the force threshold. In some examples in which it is determined that at least the plurality of the multiple force values exceeds the force threshold, method 300 may involve controlling the fingerprint sensor system based, at least in part, on whether the plurality of the multiple force values matches a digit touch force pattern. According to some such methods, method 300 may involve preventing a fingerprint sensor scan if the multiple force values do not exceed the force threshold and/or if the plurality of the multiple force values do not match the digit touch force pattern.

In some examples, the digit touch force pattern may be, or may include, a sequence of force measurements. In some such examples, the digit touch force pattern may be, or may include, a sequence of force measurements that is within a force range. In some examples, method 300 may involve determining whether the sequence of force measurements includes at least N consecutive increasing force measurements within the force range. In some examples, N may an integer ≥2, ≥3, ≥4, ≥5, etc.

According to some examples, the sequence of force measurements may correspond to a characteristic sequence of forces caused by a digit being pressed on a surface of the apparatus (also referred to herein as a "finger down" force pattern, a "finger down" force sequence, a "digit down" force pattern, etc.). FIG. 3B shows examples of sequences of forces caused by various phenomena, including finger down force sequences. In these examples, multiple force values were obtained at a force sampling time interval of 4 ms, during a force monitoring time interval of 20 ms. In some alternative examples, the force sampling time interval may be less than 4 ms, or greater than 4 ms. In some alternative examples, the force monitoring time interval may be less than 20 ms, or greater than 20 ms. In an alternative, the force monitoring time interval may vary depending on one or more measured forces. In another alternative, the force monitoring time interval may vary depending on one or more previously-detected force patterns. In yet another alternative, the force monitoring time interval may vary depending on an expected force pattern. For example, a sequence of force measurements for a "finger down" force sequence during a successful authentication process of an authorized user, and a corresponding time interval, may be measured and stored. The sequence of force measurements (and possibly other sequences of force measurements acquired and saved during successful authentication processes of the authorized user) may be used to determine a characteristic "finger down" force sequence for the authorized user. The measured force time intervals may, in some examples, be used to modify the force monitoring time interval. For example, if the force monitoring time interval had been 30 ms and the forces in the sequence of force measurements received from the authorized user during a "finger down" force sequence had typically reached a maximum force level after 25 ms, the force monitoring time interval may be re-set to 25 ms.

In this example, rows 325 and 330 of table 301 provide examples of sequences of measured forces corresponding to digits being pressed on an outer surface of an apparatus in a fingerprint sensor area during the force monitoring time interval. Row 325 of table 301 shows examples of measured forces corresponding to a finger being pressed with a "normal finger press" or average range of forces. Row 330 shows examples of measured forces corresponding to a finger being pressed with a "light finger press" or lower-than-average range of forces. In both the normal finger press and light finger press examples, the lowest measured force during the force monitoring time interval is 50 gf. In both the normal finger press and light finger press examples, the measured forces steadily increase to a maximum force that was measured during the force monitoring time interval. The normal finger press and light finger press force sequences that are shown in FIG. 3B are examples of digit touch force patterns that include sequences of force measurements that are within a force range (in these examples, a force range having a minimum force threshold of 50 gf and ranging to at least 150 gf). In an alternative, the force measurements may take into account a force calibration value which may be added or subtracted to the force measurement to produce a calibrated force measurement. This calibrated force measurement may be substituted for a force measurement. In some examples, calibrated force measurements may be used to compensate for inter-device variations between devices or intra-device variations between portions of the same device. According to some examples, intra-device variations may be caused by localized forces that are applied to a portion of a device, such as forces applied by a device case, a device cover, etc., to a portion of a device screen. In some examples, intra-device variations may be caused by a user's manner of holding a device. In some instances, intra-device variations may be caused by device damage, such as damage caused by dropping the device. For example, if a device has been dropped, a portion of the device (such as a corner of the device) may be damaged more than other portions of the device. In some instances, intra-device variations may be caused by a device display partially delaminating over time. The relatively more-damaged device portion(s) may measure applied forces differently than the relatively less-damaged device portions. A device control system may, in some examples, be configured to determine a force calibration value based, at least in part, on a difference between force measurements from one portion of the device (such as a relatively more-damaged device portion or a portion on which a device cover is pressing) and force measurements from another portion of the device (such as a relatively less-damaged device portion or a portion on which a device cover is not pressing). The force calibration value may, for example, be based on multiple measurements from different portions of the device that are obtained over a time interval, such as a time interval of hours, days, weeks, etc. The device control system may, in some examples, be configured to compensate for such intra-device variations by adding or subtracting the force calibration value, to produce a calibrated force measurement.

Rows 335, 340 and 345 of table 301 provide examples of sequences of measured forces not corresponding to digits being pressed on an outer surface of an apparatus in a fingerprint sensor area during the force monitoring time interval. Row 335 shows a measured force sequence that was caused by lightweight objects (in this example, coins) that were on an outer surface of an apparatus in a fingerprint sensor area while the apparatus was in a moving vehicle. In this example, the measured forces do not reach the minimum 50 gf observed in the light and normal finger touch examples. Moreover, the measured forces do not steadily increase, but increase and decrease during the force monitoring time interval.

Row 340 shows a measured force sequence that was caused by a lightweight object that was placed on an outer surface of an apparatus in a fingerprint sensor area. In this example, the measured forces steadily increase to 50 gf and remain at 50 gf.

Row 345 shows a measured force sequence that was caused by a person moving on a treadmill with the apparatus in a pocket. In this example, the measured forces do not reach the minimum 50 gf observed in the light and normal finger touch examples. Moreover, the measured forces do not steadily increase, but increase and decrease during the force monitoring time interval.

Accordingly, FIG. 3B shows examples of how sequences of measured forces can be used to distinguish finger presses from other events. In these examples, a threshold force of at least 50 gf, followed by a steady increase of measured force during the force monitoring time interval (or at least a portion of the force monitoring time interval), could be used to distinguish finger presses from other events.

FIG. 3C shows examples of sequences of forces caused by a digit being lifted from an outer surface of an apparatus. Such a sequence of forces may also be referred to herein as a "finger up" force pattern, a "digit up" force pattern, etc. In these examples, multiple force values were obtained at a force sampling time interval of 10 ms, during a force monitoring time interval of 50 ms. In both examples, the force monitoring time interval was initiated after a digit down or "finger down" force pattern had been detected.

Here, row 350 of table 302 shows a sequence of forces corresponding to a "finger up" or "digit up" force pattern for a normal finger up event. In this example, the normal finger up event begins with a maximum force of 350 gf and steadily decreases to a force of 0 gf. According to this example, row 355 of table 302 shows a measured sequence of forces corresponding to a digit up force pattern for a light touch finger up event. In this example, the light touch finger up event begins with a maximum force of 150 gf and steadily decreases to a force of 0 gf.

Figure 4:
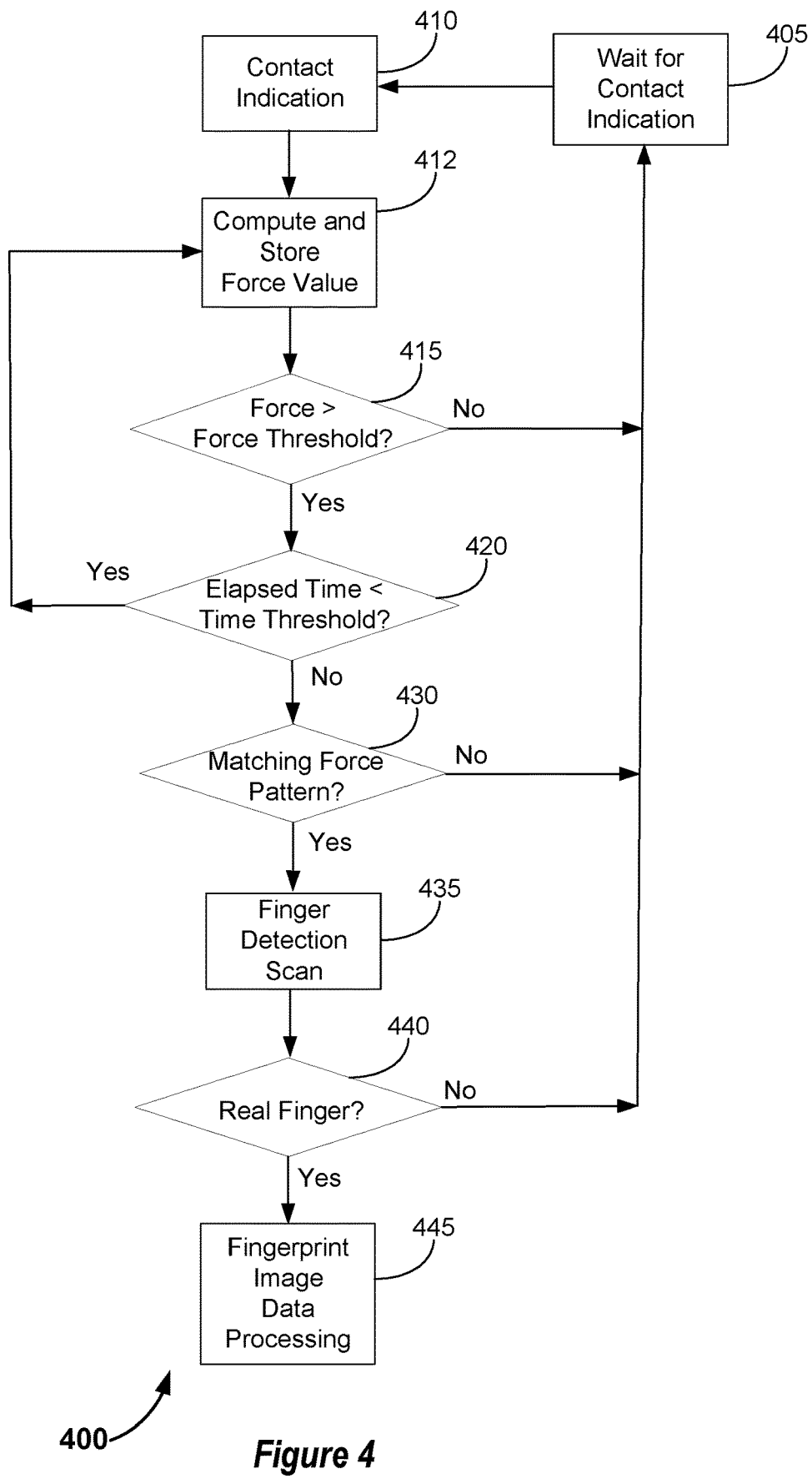
FIG. 4 is a flow diagram that provides examples of operations according to some disclosed methods.

FIG. 4 is a flow diagram that provides examples of operations according to some disclosed methods. The blocks of FIG. 4 may, for example, be performed by the apparatus 101 of FIG. 1 or FIG. 2, or by a similar apparatus. For example, the blocks of FIG. 4 may be performed, at least in part, by the control system 106 of FIG. 1 or FIG. 2. As with other methods disclosed herein, the methods outlined in FIG. 4 may include more or fewer blocks than indicated. Moreover, the blocks of methods disclosed herein are not necessarily performed in the order indicated. In some implementations, one or more blocks may be performed concurrently.

In this example, block 405 corresponds to a waiting period. Here, block 405 corresponds to a period of time prior to receiving a contact indication, which is an indication of contact with an apparatus. In some examples, a contact indication may be an indication of contact with an outer surface of the apparatus in a fingerprint sensor area. In some instances, the contact indication may correspond with an object in contact with an outer surface of the apparatus in the fingerprint sensor area, such as a finger touch or tap intended to initiate a fingerprint-based authentication process. In some implementations, at least a portion of a fingerprint sensor system 102 may include a piezoelectric sensor component. In some such examples, the contact indication threshold may correspond with an electric signal from the piezoelectric sensor component. However, in some examples the contact indication may correspond with one or more other types of signals, such as one or more touch sensor signals from a touch sensor system.

In block 410, a contact indication is received. According to this example, associated with receiving the contact indication (e.g., responsive to receiving the contact indication), a force sensor system (such as the force sensor system 116 of FIG. 1) is activated. In some such examples, a force monitoring time interval will be initiated. In this example, a force value will be determined and stored in block 412, and the process will then continue to block 415.

In this example, block 415 involves determining (in this example, by a control system and according to input from the force sensor system) whether a force corresponding with the contact indication is greater than a force threshold. In some alternative examples, block 415 may involve determining whether a force corresponding with the contact indication is greater than or equal to a force threshold. In some examples, the force threshold may correspond with a minimum value of a force sequence corresponding to a "finger down" event, for example the 50 gf value discussed above with reference to FIG. 3A or one of the other force threshold values disclosed herein. In this example, if it is determined in block 415 that a force corresponding with the contact indication is not greater than the force threshold, the process returns to block 405.

However, according to this example, if it is determined in block 415 that a force corresponding with the contact indication is greater than the force threshold, the process continues to block 420. In block 420, it is determined whether the elapsed force measurement time is within a threshold time corresponding to the force monitoring time interval. For example, if the force monitoring time interval is 20 ms, the threshold time would also be 20 ms. In this example, if it is determined in block 420 that the elapsed force measurement time is less than the threshold time, the process will revert to block 412 and a force value will be determined and stored. The process will then continue to block 415.

In this example, if the forces corresponding with the contact indication continue to be greater than the force threshold of block 415, forces will continue to be determined and corresponding force values will continue to be stored during the force monitoring time interval of block 420. In some instances, one or more of the force values may be calibrated force values. The inventors have observed that false wakeups typically occur due to events that persist for only a few milliseconds, for example events that persist for only 5 ms or less. By selecting a force monitoring time interval that is longer than the typical persistence time interval for false wakeups (e.g., 10 ms, 15 ms, 20 ms, 25 ms, 30 ms, etc.), many false wakeups can be prevented. According to some examples, the force monitoring time interval may be based, at least in part, on one or more time intervals corresponding to force measurements previously received from an authorized user during one or more successful authentication processes. In some examples, method 400 may involve performing blocks 412, 415 and 420 three or more times during the force monitoring time interval, for example 3, 4, 5, 6, 7, 8 or 9 times. In some examples, multiple force values may be obtained in block 412 at a force sampling time interval, such as 1 millisecond (ms), 2 ms, 3 ms, 4 ms, 5 ms, 6 ms, 7 ms, 8 ms, 9 ms, 10 ms, or some other force sampling time interval.

According to this example, if it is determined in block 420 that the elapsed force measurement time is greater than (or, in some examples, greater than or equal to) the threshold time, the process will continue to block 430. In this example, block 430 involves determining whether the forces measured during the force monitoring time interval correspond with one or more digit touch force patterns. As noted elsewhere herein, a digit touch force pattern may be a characteristic sequence of forces caused by a digit being pressed on a surface of the apparatus, such as one of the "finger down" force patterns described with reference to FIG. 3B. In some examples, the characteristic sequence of forces may be based, at least in part, on one or more sequences of force measurements previously obtained and stored during one or more successful authentication processes involving an authorized user. According to some examples, block 430 may involve determining whether the forces measured during the force monitoring time interval include at least N consecutive increasing force measurements. In some such examples, N may be an integer ≥3. In some instances, block 430 may involve determining whether the forces measured during the force monitoring time interval include at least N consecutive increasing force measurements within a force range, such as the "normal finger press" force range or the "light finger press" force range of FIG. 3B. According to this example, if it is determined in block 430 that the forces measured during the force monitoring time interval do not correspond with one or more digit touch force patterns, the process reverts to block 405.

However, in this example, if it is determined in block 430 that the forces measured during the force monitoring time interval do correspond with one or more digit touch force patterns, the process continues to block 435. In this example, block 435 is a process that involves initiating a fingerprint sensor scan. Initiating the fingerprint sensor scan may involve controlling, by the control system, the fingerprint sensor system to transmit ultrasonic waves, light, etc., towards an object associated with the contact indication, such as an object in contact with a surface of an apparatus that includes a fingerprint sensor system. The object may be in contact with an outer surface of an apparatus in a fingerprint sensor area.

In this example, block 440 involves estimating, based at least in part on fingerprint image data associated with the fingerprint sensor scan, whether the object is a digit. In some examples, block 440 may involve determining whether an object shape corresponds with a digit shape. In some examples, block 440 may involve determining whether the object includes fingerprint features, or fingerprint-like features, on its surface. Other examples may involve other methods of determining whether the object is a digit (such as one or more liveness detection methods, an evaluation of the acoustic impedance of the object, etc.). In this example, if it is determined in block 440 that the object is not a digit, the process reverts to block 405.

However, in this example, if it is determined in block 440 that the object is a digit, the process continues to block 445. Here, block 445 involves one or more fingerprint image data processing methods. Block 445 may, for example, involve determining fingerprint features from fingerprint image data, which may be (or may include) the fingerprint image data obtained in block 435. The fingerprint features may include fingerprint minutiae, sweat pores, etc., that can be used in a fingerprint feature matching process.

In some examples, such as that of FIG. 2, blocks 440 and 445 may be performed by different parts of a control system. For example, as shown in FIG. 2, a fingerprint sensor system may include a fingerprint sensor control system portion 206a that is configured to control the transmitter portion 207 and is configured to estimate, based at least in part on fingerprint sensor data obtained from an object in contact with the outer surface of the apparatus in the fingerprint sensor area, whether the object is a finger. In some such examples, a fingerprint image data processing control system portion 206b may be configured to process fingerprint image data 209 obtained by the fingerprint sensor system 102 responsive to receiving an host wakeup signal 208 and fingerprint image data 209 from the fingerprint sensor control system portion 206a. In some such examples, the fingerprint image data processing control system portion 206b may be implemented by a host processor 212. In some such examples, if it is determined in block 435 that the object is a digit, the fingerprint sensor control system portion 206a may send a host wakeup signal 208 to the fingerprint image data processing control system portion 206b.

Method 400 may, in some examples, involve an authentication process. Method 400 may, for example, involve determining whether currently-obtained fingerprint features match previously-obtained fingerprint features, such as fingerprint features obtained during an enrollment process. Method 400 may, in some examples, involve controlling access to a device that includes the fingerprint sensor system, controlling access to a software application, etc., according to a result of the authentication process.

Figure 5:
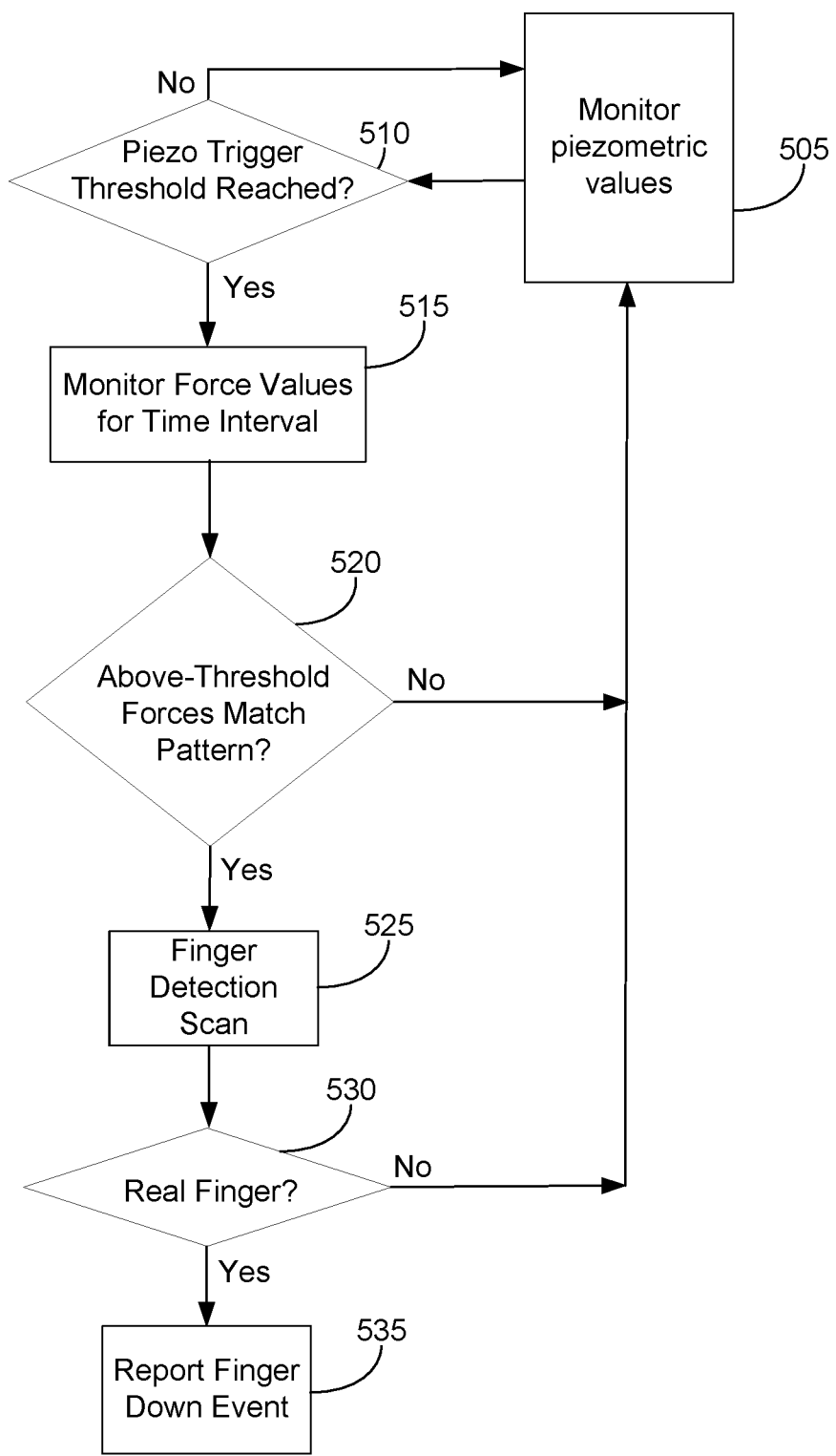
FIG. 5 is a flow diagram that provides examples of operations according to some disclosed methods.

FIG. 5 is a flow diagram that provides examples of operations according to some disclosed methods. The blocks of FIG. 5 may, for example, be performed by the apparatus 101 of FIG. 1 or FIG. 2, or by a similar apparatus. For example, the blocks of FIG. 5 may be performed, at least in part, by the control system 106 of FIG. 1 or FIG. 2. As with other methods disclosed herein, the methods outlined in FIG. 5 may include more or fewer blocks than indicated. Moreover, the blocks of methods disclosed herein are not necessarily performed in the order indicated. In some implementations, one or more blocks may be performed concurrently.

According to this example, block 505 involves one aspect of detecting a contact indication. In this example, block 505 involves monitoring signals from a piezometric sensor, e.g., monitoring the signals for a time interval. As noted elsewhere herein, in some implementations, at least a portion of a fingerprint sensor system may include a piezoelectric sensor component, such as the wakeup sensor portion 202 shown in FIG. 2. In some such examples, block 505 may involve monitoring signals from the piezoelectric sensor component. In this example, if a piezometric signal is received, the process continues to block 510.

In this example, block 510 involves determining whether the received piezometric signal corresponds with a value (such a voltage level) that equals or exceeds a piezometric threshold value (such a voltage threshold). According to this example, a piezometric value that equals or exceeds the piezometric threshold value is a type of contact indication that will initiate a force detection process. Therefore, if it is determined in block 510 that the received piezometric value equals or exceeds the piezometric threshold value, the process continues to block 515.

In this example, block 515 involves monitoring force values associated with the contact indication for a force monitoring time interval. In some instances, one or more of the force values may be calibrated force values. According to this example, block 515 involves activating a force sensor system (such as the force sensor system 116 of FIG. 1). In some instances, block 515 may involve implementing blocks 412, 415 and 420 of FIG. 4, or similar blocks.

According to this example, block 520 involves determining whether forces measured within the force monitoring time interval of block 515 that are above a force threshold match a pattern. In some examples, the force threshold may correspond with a minimum value of a force sequence corresponding to a "finger down" event, for example the 50 gf value discussed above with reference to FIG. 3A or one of the other force threshold values disclosed herein. According to some such examples, the pattern may be a digit touch force pattern, such as one of the "finger down" force patterns described with reference to FIG. 3B. In some examples, the force threshold, the force pattern, or both, may be based (at least in part) on force measurements obtained and stored during previous successful authentication processes involving an authorized user. According to some examples, block 520 may involve determining whether the forces measured during the force monitoring time interval include at least N consecutive increasing force measurements above the force threshold. In some such examples, N may be an integer ≥3. In some instances, block 520 may involve determining whether the forces measured during the force monitoring time interval include at least N consecutive increasing force measurements within a force range (e.g., a force range above the force threshold), such as the "normal finger press" force range or the "light finger press" force range of FIG. 3B. According to this example, if it is determined in block 520 that the above-threshold forces measured during the force monitoring time interval do not correspond with one or more digit touch force patterns, the process reverts to block 505.

However, in this example, if it is determined in block 520 that the above-threshold forces measured during the force monitoring time interval do correspond with one or more digit touch force patterns, the process continues to block 525. In some examples, blocks 525 and 530 may correspond to blocks 435 and 440 of FIG. 4. In this example, if it is determined in block 530 that the object is not a digit, the process reverts to block 505.

However, if it is determined in block 530 that the object is a digit, the process continues to block 535 and a "finger down" event is determined and stored. In some examples, method 500 (or a subsequent process) may involve determining whether and/or when a "finger up" event occurs. According to some examples, method 500 may involve fingerprint image data processing procedures and/or authentication procedures such as those described above with reference to FIG. 4.

Figure 6:
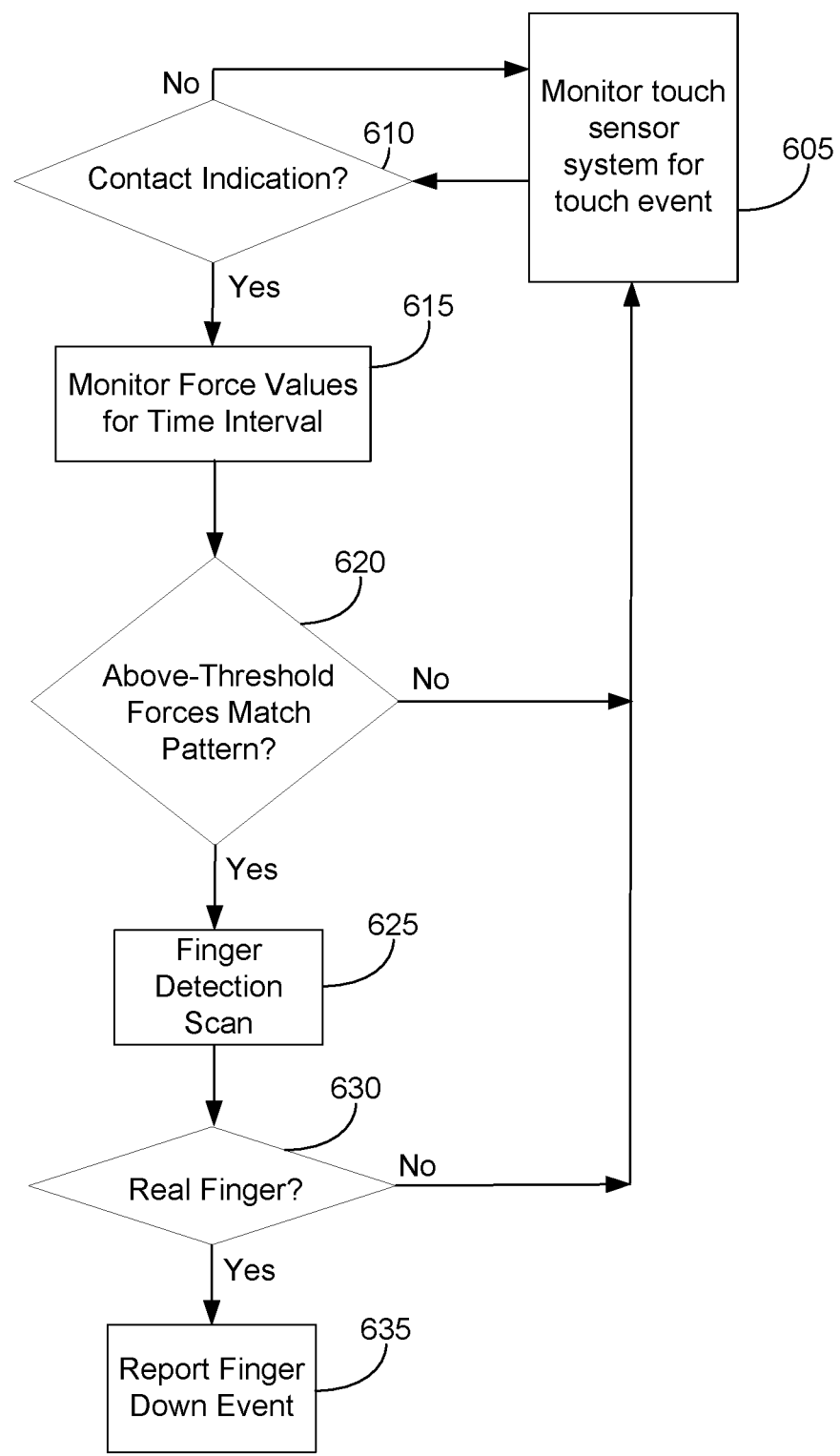
FIG. 6 is a flow diagram that provides examples of operations according to some disclosed methods.

FIG. 6 is a flow diagram that provides examples of operations according to some disclosed methods. The blocks of FIG. 6 may, for example, be performed by the apparatus 101 of FIG. 1 or FIG. 2, or by a similar apparatus. For example, the blocks of FIG. 6 may be performed, at least in part, by the control system 106 of FIG. 1 or FIG. 2. As with other methods disclosed herein, the methods outlined in FIG. 6 may include more or fewer blocks than indicated. Moreover, the blocks of methods disclosed herein are not necessarily performed in the order indicated. In some implementations, one or more blocks may be performed concurrently.

According to this example, blocks 605 and 610 involve detecting a contact indication according to input from a touch sensor system. In this example, block 605 involves monitoring signals from a touch sensor system, e.g., for a time interval. In some such examples, block 605 may involve monitoring signals from the touch sensor system 103 of FIG. 1 or FIG. 2.

In this example, block 610 involves determining whether one or more touch sensor signals corresponding with a contact indication have been received. In some implementations, block 610 may involve determining whether one or more touch sensor signals equal to or exceeding a baseline or background level have been received. In some examples, block 610 may involve determining whether one or more touch sensor signals corresponding to a finger contact, such as touch sensor signals in an area of a typical finger size have been received. In some implementations, block 610 may involve determining whether one or more touch sensor signals have been received in a fingerprint sensor area of an apparatus. According to this example, if it is determined in block 610 that one or more touch sensor signals corresponding with a contact indication have been received, the process continues to block 615.

In this example, block 615 involves monitoring force values associated with the contact indication for a force monitoring time interval. According to this example, block 615 involves activating a force sensor system (such as the force sensor system 116 of FIG. 1). In some instances, block 615 may involve implementing blocks 412, 415 and 420 of FIG. 4, or similar blocks. According to this example, blocks 620, 625, 630 and 635 correspond to blocks 520, 525, 530 and 535 of FIG. 5.

Figure 7:
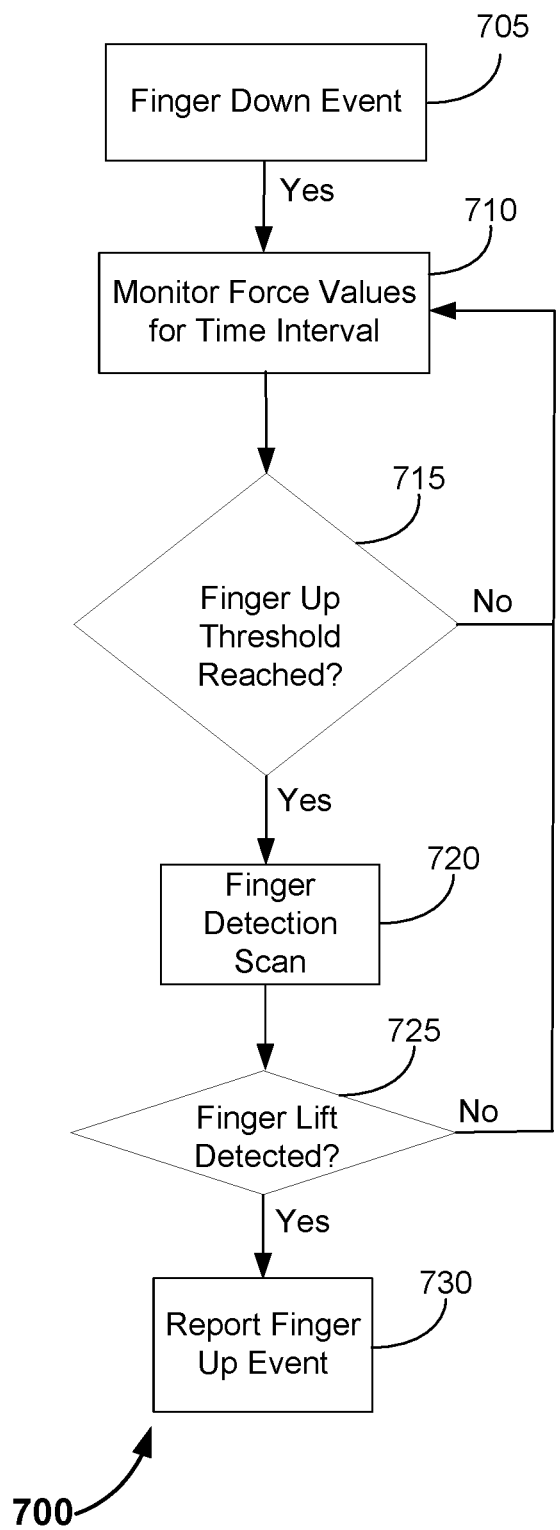
FIG. 7 is a flow diagram that provides examples of operations according to some disclosed methods.

FIG. 7 is a flow diagram that provides examples of operations according to some disclosed methods. The blocks of FIG. 7 may, for example, be performed by the apparatus 101 of FIG. 1 or FIG. 2, or by a similar apparatus. For example, the blocks of FIG. 7 may be performed, at least in part, by the control system 106 of FIG. 1 or FIG. 2. As with other methods disclosed herein, the methods outlined in FIG. 7 may include more or fewer blocks than indicated. Moreover, the blocks of methods disclosed herein are not necessarily performed in the order indicated. In some implementations, one or more blocks may be performed concurrently.

According to this example, block 705 involves receiving an indication of a "finger down" event. In some such examples, block 705 may be performed after, or concurrently with, detecting a "finger down" event via method 500 or method 600. In this example, method 700 involves evaluating forces detected after a finger down event in order to detect a possible finger up event. In some examples, method 700 may involve determining whether a digit up force threshold is reached. In some such examples, method 700 may involve controlling a fingerprint sensor system based, at least in part, on determining whether the digit up force threshold is reached.

According to this implementation, block 710 involves activating a force sensor system (such as the force sensor system 116 of FIG. 1). In this example, block 710 involves monitoring force values for a force monitoring time interval. The force monitoring time interval and/or the force sampling rate may or may not be the same force monitoring time interval as those discussed with reference to FIG. 5 or FIG. 6, depending on the particular implementation. In some examples, a force monitoring time interval for evaluating a possible finger up event may be longer than a force monitoring time interval for evaluating a possible finger down event. In some such instances, the force monitoring time interval may be 25 ms, 30 ms, 35 ms, 40 ms, 45 ms, 50 ms, or some other force monitoring time interval.

In this example, block 715 involves determining whether a "finger up threshold," also referred to herein as a "digit up threshold," is reached. In this example, the finger up threshold is a measured force value. In some examples, the finger up threshold may be a force of 50 gf, or less than 50 gf. In some examples, the finger up threshold may be zero gf. According to some examples, block 715 (or another aspect of method 700) may involve determining whether a sequence of measured force values corresponding with a finger up event has been detected. In some such examples, the sequence of measured force values may be at least a threshold number (such as 2, 3, 4, 5, etc.) of decreasing force values in a sequence. In some such examples, the sequence of measured force values may be with a range of force values, such as the range of force values in one of the sequences of force values shown in FIG. 3B. In this example, if it is determined in block 715 that a finger up event (including at least a finger up threshold) has not been detected, the process reverts to block 710.

According to this example, if it is determined in block 715 that a finger up event (including at least a finger up threshold) has been detected, the process continues to block 720. In this example, block 720 involves a finger detection process, which may in some examples correspond with, or be similar to, the finger detection process described herein with reference to blocks 525 and 530 of FIG. 5.

In this example, block 725 involves determining whether a finger lift has been detected. In some examples, block 725 may involve determining the absence of a finger touching a fingerprint sensor area of an apparatus that includes a fingerprint sensor. In some instances, block 725 may involve determining whether at least a portion of a finger is still in contact with, or near, the fingerprint sensor area.

According to this example, if it is determined in block 725 that a finger lift has been detected, the finger up event is reported and stored in block 730. In this example, if it is determined in block 725 that a finger lift has not been detected, the process reverts to block 710.

Figure 8:
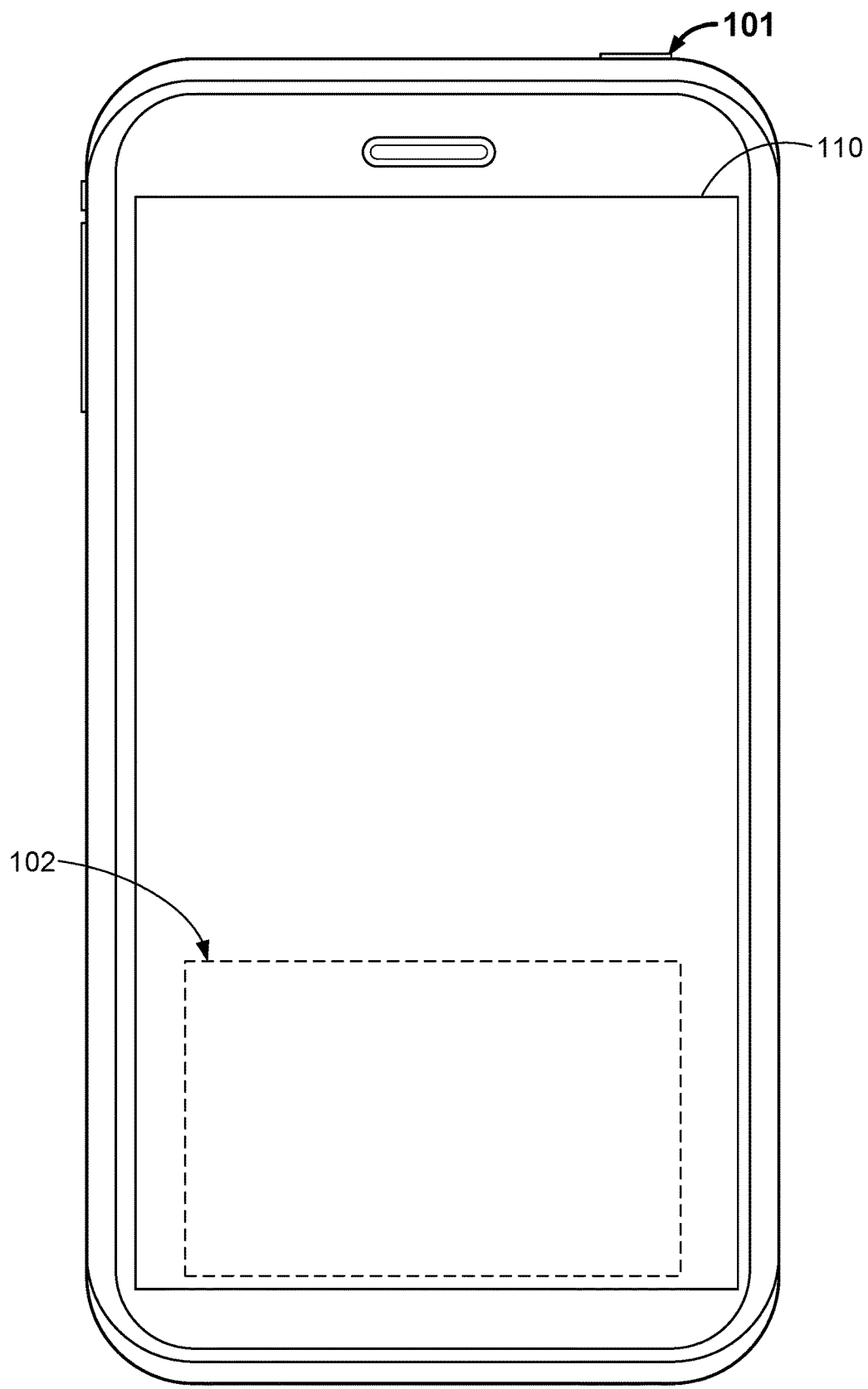
FIG. 8 shows an example of a fingerprint sensor area of an apparatus.

FIG. 8 shows an example of a fingerprint sensor area of an apparatus. In this example, the apparatus 101 is a mobile device, which in this instance is a cellular telephone. Here, the apparatus 101 includes an active area of a fingerprint sensor system 102, which is shown in a dashed outline because it resides below the display system 110 in this example. The active area of the fingerprint sensor system 102 may, for example, be the area in which an array of sensor pixels resides. The active area of the fingerprint sensor system 102 is one example of what is referred to herein as a "fingerprint sensor area." In other examples, the active area of the fingerprint sensor system 102 (and therefore the corresponding fingerprint sensor area) may be larger or smaller than that indicated in FIG. 8, or may be the same size but in a different location.

Figure 9A:
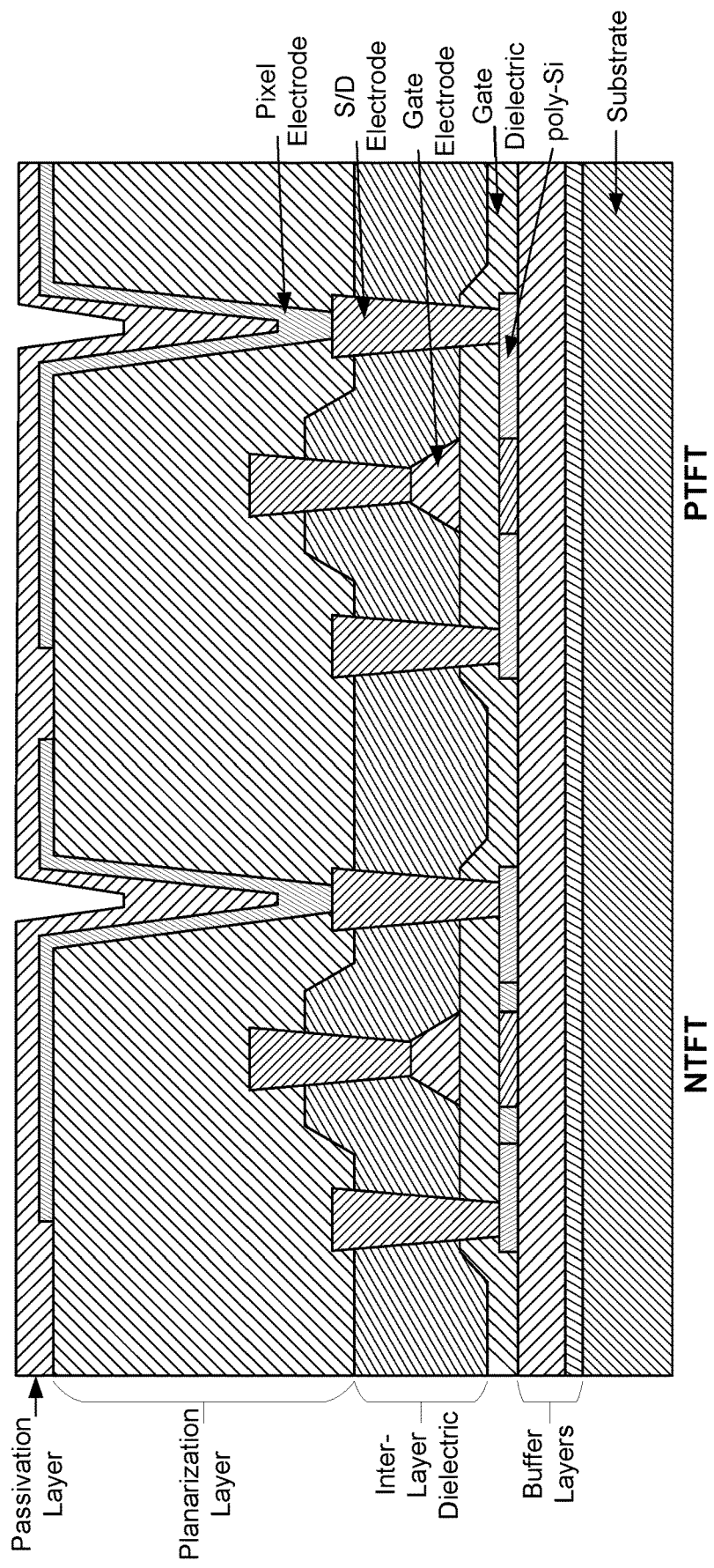
FIGS. 9A, 9B, 9C and 9D show examples of force sensors that are integrated into the circuitry of ultrasonic fingerprint sensors.

FIGS. 9A, 9B, 9C and 9D show examples of force sensors that are integrated into the circuitry of ultrasonic fingerprint sensors. FIG. 9A shows a cross-section through one example of a metal-oxide-semiconductor field-effect transistor (MOSFET), which is a complementary metal-oxide-semiconductor (CMOS) in this example. In FIG. 9A, only a single n-type thin-film transistor (NTFT) and a single p-type TFT (PTFT) are shown. However, in an actual ultrasonic fingerprint sensor having this type of structure would normally have many more NTFT/PTFT pairs (for example, tens of thousands of NTFT/PTFT pairs).

Depending on the particular implementation, portions of different conductive layers of the stack shown in FIG. 9A may be used for a pressure sensor. In some examples, a portion of the pixel electrode layer may be used for the pressure sensor. In other examples, a portion of the source/drain (S/D) electrode layer may be used for the pressure sensor. According to some implementations, a portion of the gate electrode layer may be used for the pressure sensor. In some examples, a portion of the polycrystalline silicon (poly-Si) layer may be used for the pressure sensor. In some implementations, the poly-Si layer may include low-temperature polycrystalline silicon (LTPS).

Figure 9B:
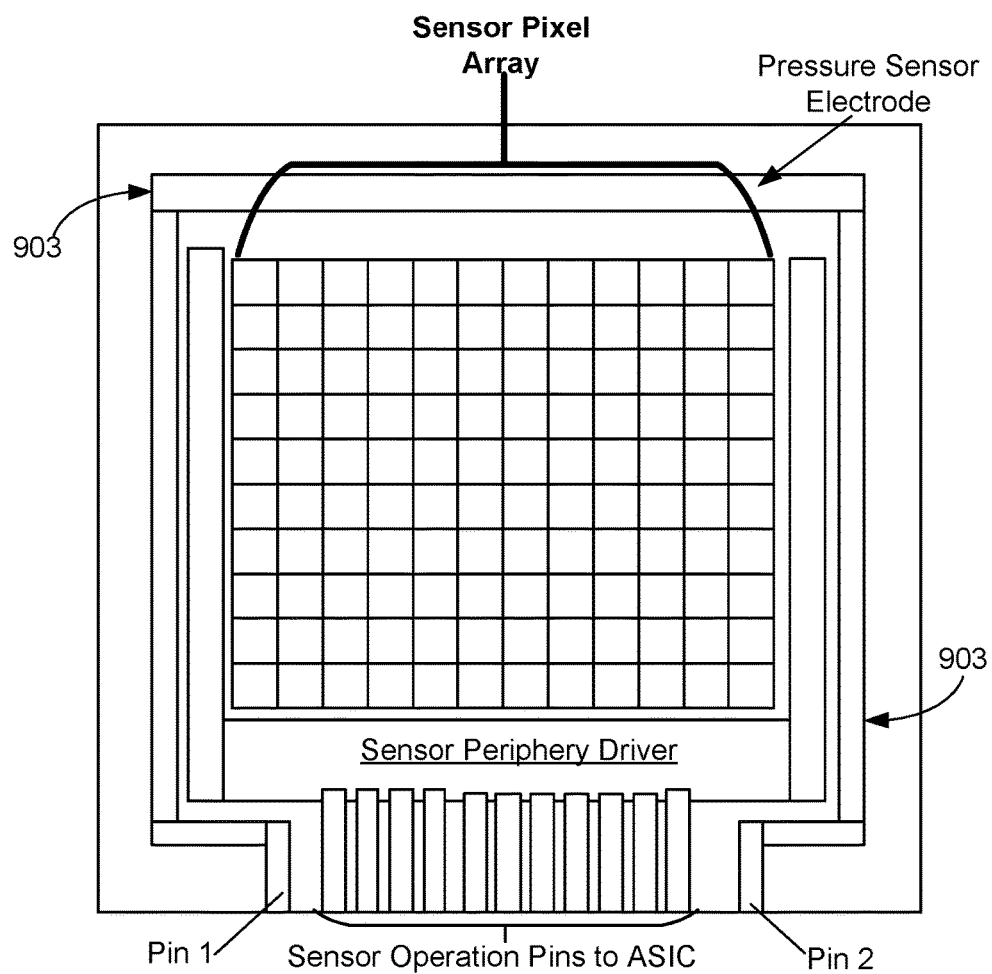

FIG. 9B shows an example of a top view of an ultrasonic fingerprint sensor. In this example, the sensor pixel array and the sensor periphery driver each include multiple instances of a CMOS such as that shown in FIG. 9A. In this instance, a portion of the pixel electrode layer is configured to be used as a conductive part of a pressure sensor. According to this implementation, pin 1, pin 2 and the connected portions 903 of the pixel electrode layer are configured as a pressure sensor electrode. In this example the other pins, which are labeled in FIG. 9A as "sensor operation pins to ASIC," may be used to connect the ultrasonic fingerprint sensor to a corresponding part of the control system. The control system may or may not include an ASIC depending on the particular implementation. According to some examples, the pressure sensor may also include a portion of one or more layers of piezoelectric material included in the ultrasonic fingerprint sensor.

Figure 9C:
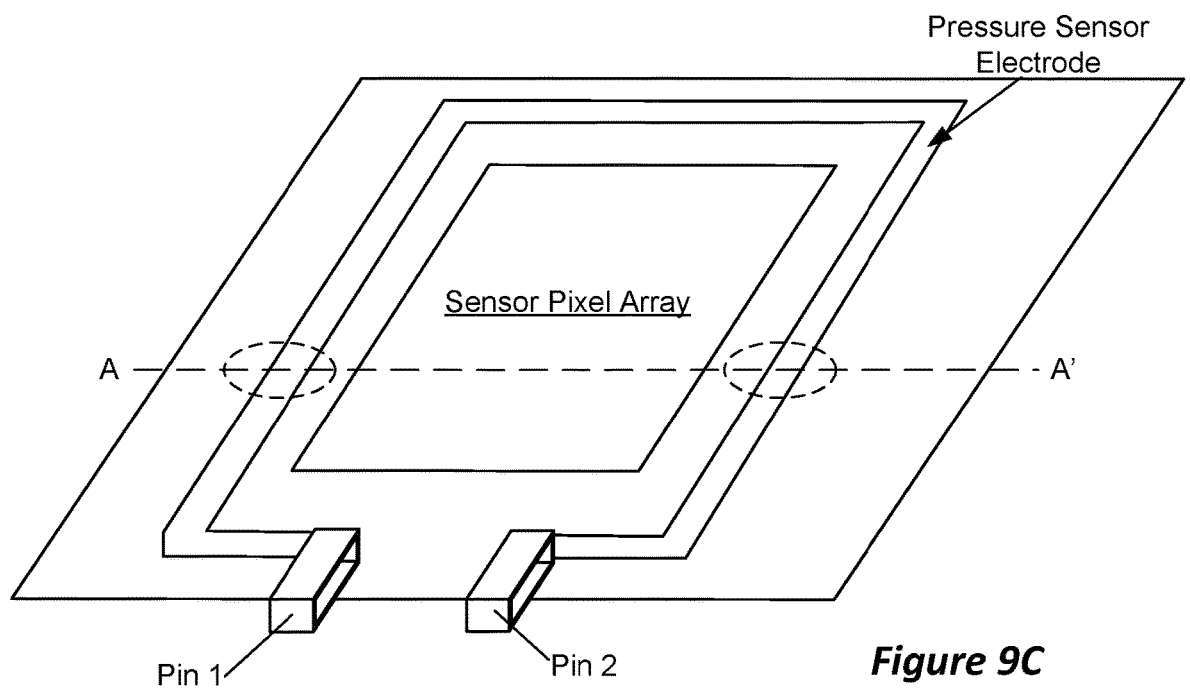

FIG. 9C shows a perspective view of the ultrasonic fingerprint sensor shown in FIG. 9B. FIG. 9C also shows cross-section line A/A', which corresponds with the cross-section shown in FIG. 9D.

Figure 9D:
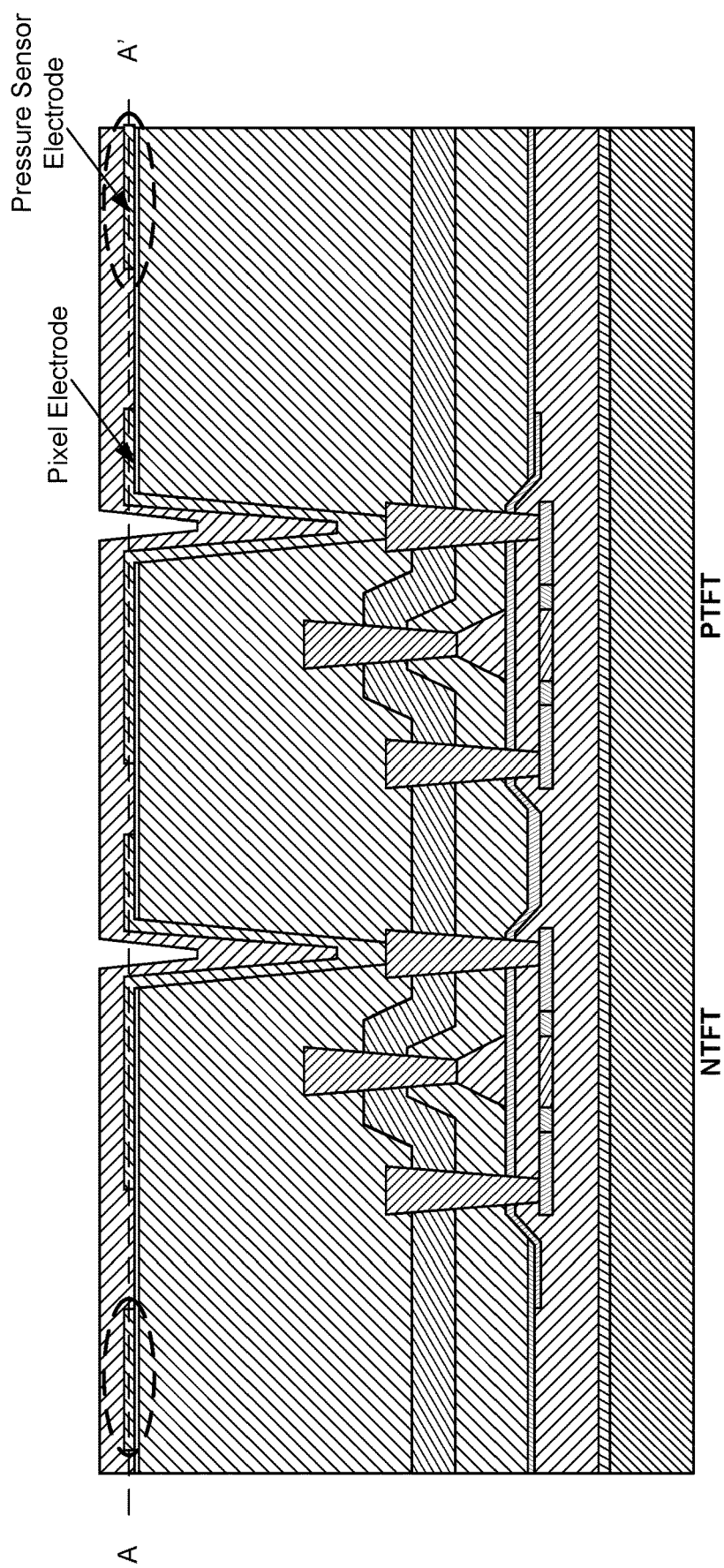

FIG. 9D is a simplified cross-section through the ultrasonic fingerprint sensor shown in FIG. 9C. Like FIG. 9A, the example of FIG. 9D only shows a single NTFT/PTFT pair, whereas an actual ultrasonic fingerprint sensor having this type of structure would normally have many NTFT/PTFT pairs. The cross-section line A/A' is shown traversing the pixel electrode layer and includes the pixel electrodes and the pressure sensor electrodes in this example. Alternative examples in which a portion of a deeper layer (such as a portion of the source/drain (S/D) electrode layer, a portion of the gate electrode layer or a portion of the poly-Si layer) is used to form the pressure sensor electrodes, the device may include vias to connect the deeper layers to a chip pin or other corresponding part of the control system.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, e.g., a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also may be implemented as one or more computer programs, i.e., one or more modules of computer program instructions, encoded on a computer storage media for execution by, or to control the operation of, data processing apparatus.

If implemented in software, the functions may be stored on or transmitted over as one or more instructions or code on a computer-readable medium, such as a non-transitory medium. The processes of a method or algorithm disclosed herein may be implemented in a processor-executable software module which may reside on a computer-readable medium. Computer-readable media include both computer storage media and communication media including any medium that may be enabled to transfer a computer program from one place to another. Storage media may be any available media that may be accessed by a computer. By way of example, and not limitation, non-transitory media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection may be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those having ordinary skill in the art, and the generic principles defined herein may be applied to other implementations without departing from the spirit or scope of this disclosure. Thus, the disclosure is not intended to be limited to the implementations shown herein, but is to be accorded the widest scope consistent with the claims, the principles and the novel features disclosed herein. The word "exemplary" is used exclusively herein, if at all, to mean "serving as an example, instance, or illustration." Any implementation described herein as "exemplary" is not necessarily to be construed as preferred or advantageous over other implementations.

Certain features that are described in this specification in the context of separate implementations also may be implemented in combination in a single implementation. Conversely, various features that are described in the context of a single implementation also may be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products. Additionally, other implementations are within the scope of the following claims. In some cases, the actions recited in the claims may be performed in a different order and still achieve desirable results.

It will be understood that unless features in any of the particular described implementations are expressly identified as incompatible with one another or the surrounding context implies that they are mutually exclusive and not readily combinable in a complementary and/or supportive sense, the totality of this disclosure contemplates and envisions that specific features of those complementary implementations may be selectively combined to provide one or more comprehensive, but slightly different, technical solutions. It will therefore be further appreciated that the above description has been given by way of example only and that modifications in detail may be made within the scope of this disclosure.

Implementation examples are described in the following numbered clauses:

1. A method of controlling a fingerprint sensor system, the method involving: receiving a contact indication corresponding to a contact of an object with a surface of an apparatus; determining multiple force values corresponding to the contact of the object with the surface during a force monitoring time interval; determining whether at least a plurality of the multiple force values exceeds a force threshold; and controlling the fingerprint sensor system based, at least in part, on whether at least the plurality of the multiple force values exceeds the force threshold.

2. The method of clause 1, where it is determined that at least the plurality of the multiple force values exceeds the force threshold, further involving controlling the fingerprint sensor system based, at least in part, on whether the plurality of the multiple force values matches a digit touch force pattern.

3. The method of clause 2, where the digit touch force pattern includes a sequence of force measurements.

4. The method of clause 3, where the sequence of force measurements is within a force range.

5. The method of clause 4, where the sequence of force measurements includes at least N consecutive increasing force measurements within the force range, where N is an integer ≥3.

6. The method of any one of clauses 2-5, further involving initiating a fingerprint sensor scan associated with determining that the plurality of the multiple force values matches the digit touch force pattern.

7. The method of clause 6, further involving estimating, based at least in part on fingerprint image data associated with the fingerprint sensor scan, whether the object is a digit.

8. The method of clause 7, further involving initiating fingerprint image data processing functionality responsive to estimating that the object is a digit.

9. The method of clause 8, where initiating the fingerprint image data processing functionality includes sending a wakeup signal to a portion of a control system.

10. The method of any one of clauses 2-9, where the digit touch force pattern is a digit down force pattern associated with a digit press on the surface or a digit up force pattern associated with a digit lift from the surface.

11. The method of clause 10, where the digit touch force pattern is the digit up force pattern, further involving: determining whether a digit up force threshold is reached; and controlling the fingerprint sensor system based, at least in part, on whether the digit up force threshold is reached.

12. The method of any one of clauses 1-11, where the contact indication includes input from a touch sensor system.

13. The method of any one of clauses 1-12, where the contact indication includes input from a piezoelectric sensor.

14. The method of clause 13, where the piezoelectric sensor is a component of the fingerprint sensor system.

15. An apparatus, including: a fingerprint sensor system; a force sensor system; and a control system configured to: receive a contact indication corresponding to a contact of an object with a surface of the apparatus; determine, via the force sensor system, multiple force values corresponding to the contact of the object with the surface during a force monitoring time interval; determine whether at least a plurality of the multiple force values exceeds a force threshold; and control the fingerprint sensor system based, at least in part, on whether at least the plurality of the multiple force values exceeds the force threshold.

16. The apparatus of clause 15, where the control system determines that at least the plurality of the multiple force values exceeds the force threshold and where the control system is further configured to control the fingerprint sensor system based, at least in part, on whether the plurality of the multiple force values matches a digit touch force pattern.

17. The apparatus of clause 16, where the digit touch force pattern includes a sequence of force measurements.

18. The apparatus of clause 17, where the sequence of force measurements is within a force range.

19. The apparatus of clause 18, where the sequence of force measurements includes at least N consecutive increasing force measurements within the force range, where N is an integer ≥3.

20. The apparatus of any one of clauses 16-19, where the control system is further configured to control the fingerprint sensor system to initiate a fingerprint sensor scan associated with determining that the plurality of the multiple force values matches the digit touch force pattern.

21. The apparatus of clause 20, where the control system is further configured to estimate, based at least in part on fingerprint image data associated with the fingerprint sensor scan, whether the object is a digit.

22. The apparatus of clause 21, where the control system is further configured to initiate fingerprint image data processing functionality responsive to estimating that the object is a digit.

23. The apparatus of clause 22, where initiating the fingerprint image data processing functionality includes sending a wakeup signal from a first portion of the control system configured to control the fingerprint sensor system to a second portion of the control system configured for fingerprint image data processing.

24. The apparatus of any one of clauses 16-23, where the digit touch force pattern is a digit down force pattern associated with a digit press on the surface or a digit up force pattern associated with a digit lift from the surface.

25. The apparatus of clause 24, where the digit touch force pattern is the digit up force pattern and where the control system is further configured to: determine whether a digit up force threshold is reached; and control the fingerprint sensor system based, at least in part, on whether the digit up force threshold is reached.

26. The apparatus of any one of clauses 15-25, further including a touch sensor system, where the contact indication includes input from the touch sensor system.

27. The apparatus of any one of clauses 15-25, where the contact indication includes input from a piezoelectric sensor component of the fingerprint sensor system.

28. The apparatus of any one of clauses 15-25, where the force sensor system and the fingerprint sensor system share one or more components.

29. An apparatus, including: means for receiving a contact indication corresponding to a contact of an object with a surface of the apparatus; means for determining multiple force values corresponding to the contact of the object with the surface during a force monitoring time interval; means for determining whether at least a plurality of the multiple force values exceeds a force threshold; and means for controlling a fingerprint sensor system based, at least in part, on whether at least the plurality of the multiple force values exceeds the force threshold.

30. One or more non-transitory media having instructions stored thereon, the instructions including instructions for controlling one or more devices to perform a method, the method involving: receiving a contact indication corresponding to a contact of an object with a surface of an apparatus; determining multiple force values corresponding to the contact of the object with the surface during a force monitoring time interval; determining whether at least a plurality of the multiple force values exceeds a force threshold; and controlling a fingerprint sensor system based, at least in part, on whether at least the plurality of the multiple force values exceeds the force threshold.

The invention claimed is:

1. A method of controlling a fingerprint sensor system, the method comprising:
 receiving a contact indication corresponding to a contact of an object with a surface of an apparatus;
 determining multiple force values corresponding to the contact of the object with the surface during a force monitoring time interval;
 determining whether at least a plurality of the multiple force values exceeds a force threshold;
 determining whether the plurality of the multiple force values matches a digit touch force pattern;
 responsive to determining that the plurality of the multiple force values exceeds the force threshold and matches the digit touch force pattern, controlling the fingerprint sensor system to initiate a fingerprint sensor scan;
 estimating, based at least in part on fingerprint image data associated with the fingerprint sensor scan, whether the object is a digit; and initiating fingerprint image data processing functionality responsive to estimating that the object is a digit.

2. The method of claim 1, wherein the digit touch force pattern comprises a sequence of force measurements.

3. The method of claim 2, wherein the sequence of force measurements is within a force range.

4. The method of claim 3, wherein the sequence of force measurements comprises at least N consecutive increasing force measurements within the force range, where N is an integer ≥3.

5. The method of claim 1, wherein initiating the fingerprint image data processing functionality comprises sending a wakeup signal to a portion of a control system.

6. The method of claim 1, wherein the digit touch force pattern is a digit down force pattern associated with a digit press on the surface or a digit up force pattern associated with a digit lift from the surface.

7. The method of claim 6, wherein the digit touch force pattern is the digit up force pattern, further comprising:
    determining whether a digit up force threshold is reached; and
    controlling the fingerprint sensor system based, at least in part, on whether the digit up force threshold is reached.

8. The method of claim 1, wherein the contact indication comprises input from a touch sensor system.

9. The method of claim 1, wherein the contact indication comprises input from a piezoelectric sensor.

10. The method of claim 9, wherein the piezoelectric sensor is a component of the fingerprint sensor system.

11. An apparatus, comprising:
    a fingerprint sensor system;
    a force sensor system; and
    a control system configured to:
        receive a contact indication corresponding to a contact of an object with a surface of the apparatus;
        determine, via the force sensor system, multiple force values corresponding to the contact of the object with the surface during a force monitoring time interval;
        determine whether the plurality of the multiple force values matches a digit touch force pattern;
        responsive to determining that the plurality of the multiple force values exceeds the force threshold and matches the digit touch force pattern, control the fingerprint sensor system to initiate a fingerprint sensor scan;
        estimate, based at least in part on fingerprint image data associated with the fingerprint sensor scan, whether the object is a digit; and
        initiate fingerprint image data processing functionality responsive to estimating that the object is a digit.

12. The apparatus of claim 11, wherein the digit touch force pattern comprises a sequence of force measurements.

13. The apparatus of claim 12, wherein the sequence of force measurements is within a force range.

14. The apparatus of claim 13, wherein the sequence of force measurements comprises at least N consecutive increasing force measurements within the force range, where N is an integer ≥3.

15. The apparatus of claim 11, wherein initiating the fingerprint image data processing functionality comprises sending a wakeup signal from a first portion of the control system configured to control the fingerprint sensor system to a second portion of the control system configured for fingerprint image data processing.

16. The apparatus of claim 11, wherein the digit touch force pattern is a digit down force pattern associated with a digit press on the surface or a digit up force pattern associated with a digit lift from the surface.

17. The apparatus of claim 16, wherein the digit touch force pattern is the digit up force pattern and wherein the control system is further configured to:
    determine whether a digit up force threshold is reached; and
    control the fingerprint sensor system based, at least in part, on whether the digit up force threshold is reached.

18. The apparatus of claim 11, further comprising a touch sensor system, wherein the contact indication comprises input from the touch sensor system.

19. The apparatus of claim 11, wherein the contact indication comprises input from a piezoelectric sensor component of the fingerprint sensor system.

20. The apparatus of claim 11, wherein the force sensor system and the fingerprint sensor system share one or more components.

21. An apparatus, comprising:
    a fingerprint sensor system;
    a force sensor system; and
    control means for:
        receiving a contact indication corresponding to a contact of an object with a surface of the apparatus;
        determining multiple force values corresponding to the contact of the object with the surface during a force monitoring time interval;
        determining whether at least a plurality of the multiple force values exceeds a force threshold; determining whether the plurality of the multiple force values matches a digit touch force pattern;
    responsive to determining that the plurality of the multiple force values exceeds the force threshold and matches the digit touch force pattern, controlling the fingerprint sensor system to initiate a fingerprint sensor scan;
    estimating, based at least in part on fingerprint image data associated with the fingerprint sensor scan, whether the object is a digit; and
    initiating fingerprint image data processing functionality responsive to estimating that the object is a digit.

22. One or more non-transitory media having instructions stored thereon, the instructions including instructions for controlling one or more devices to perform a method, the method comprising:
    receiving a contact indication corresponding to a contact of an object with a surface of an apparatus;
    determining multiple force values corresponding to the contact of the object with the surface during a force monitoring time interval;
    determining whether at least a plurality of the multiple force values exceeds a force threshold;
    determining whether the plurality of the multiple force values matches a digit touch force pattern;
    responsive to determining that the plurality of the multiple force values exceeds the force threshold and matches the digit touch force pattern, controlling the fingerprint sensor system to initiate a fingerprint sensor scan;
    estimating, based at least in part on fingerprint image data associated with the fingerprint sensor scan, whether the object is a digit; and
    initiating fingerprint image data processing functionality responsive to estimating that the object is a digit.

* * * * *